(12) United States Patent
Bondurant et al.

(10) Patent No.: US 8,595,253 B2
(45) Date of Patent: *Nov. 26, 2013

(54) METHODS FOR CONTROLLING REMOTE ARCHIVING SYSTEMS

(75) Inventors: Matthew D. Bondurant, Superior, CO (US); S. Christopher Alaimo, Boulder, CO (US)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,369

(22) Filed: Aug. 15, 2012

(65) Prior Publication Data

US 2012/0311259 A1    Dec. 6, 2012

Related U.S. Application Data

(63) Continuation of application No. 12/199,448, filed on Aug. 27, 2008, now Pat. No. 8,250,088.

(60) Provisional application No. 60/977,787, filed on Oct. 5, 2007.

(51) Int. Cl.
*G06F 17/30*    (2006.01)

(52) U.S. Cl.
USPC ........... 707/765; 707/766; 707/767; 707/768; 707/769; 707/770; 707/771; 709/201; 709/203; 709/213; 709/217

(58) Field of Classification Search
USPC ........... 707/765–771; 709/201, 203, 213, 217
See application file for complete search history.

(56) References Cited

U.S. PATENT DOCUMENTS

| | | | |
|---|---|---|---|
| 4,984,108 A | | 1/1991 | Grant et al. |
| 5,128,912 A | | 7/1992 | Hug et al. |
| 5,546,366 A | | 8/1996 | Dang |
| 5,631,785 A | | 5/1997 | Dang et al. |
| 5,845,082 A | * | 12/1998 | Murakami ............... 709/226 |
| 5,850,522 A | | 12/1998 | Wlaschin |
| 5,940,356 A | | 8/1999 | Toumbas |
| 5,946,686 A | * | 8/1999 | Schmuck et al. ......... 707/783 |
| 5,948,109 A | * | 9/1999 | Moiin et al. ............... 714/4.4 |
| 5,956,734 A | * | 9/1999 | Schmuck et al. ............. 1/1 |
| 5,960,446 A | * | 9/1999 | Schmuck et al. ......... 707/610 |
| 5,970,030 A | | 10/1999 | Dimitri et al. |
| 5,987,477 A | * | 11/1999 | Schmuck et al. ............. 1/1 |
| 6,028,733 A | | 2/2000 | Schmidtke et al. |
| 6,034,926 A | | 3/2000 | Dang et al. |
| 6,088,305 A | | 7/2000 | Meadows |
| 6,222,699 B1 | | 4/2001 | Luffel et al. |
| 6,230,445 B1 | | 5/2001 | Arko et al. |

(Continued)

FOREIGN PATENT DOCUMENTS

WO    WO 01-04755 A1    1/2001
WO    WO 2007-133791 A2    11/2007

*Primary Examiner* — Frantz Coby
(74) *Attorney, Agent, or Firm* — Dorsey & Whitney LLP

(57) ABSTRACT

Embodiments of the present disclosure provide a unique and novel archiving system that includes two or more network storage systems, each network storage system including removable hard disk drives embedded in removable disk cartridges, referred to simply as removable disk drives. The removable disk drives allow for expandability and replacement such that the archiving system need not be duplicated to add new or more storage capacity. In embodiments, the archiving system accesses, writes, reads, or performs functions on data from one network storage system to another remote network storage system.

20 Claims, 13 Drawing Sheets

(56) References Cited

U.S. PATENT DOCUMENTS

| | | | |
|---|---|---|---|
| 6,433,947 B1 | 8/2002 | Tadokoro et al. | |
| 6,570,734 B2 | 5/2003 | Ostwald et al. | |
| 6,697,214 B2 | 2/2004 | Dimitri et al. | |
| 6,915,065 B2 | 7/2005 | Lee | |
| 6,973,553 B1 * | 12/2005 | Archibald et al. | 711/162 |
| 7,102,849 B2 | 9/2006 | Donkin et al. | |
| 7,191,357 B2 * | 3/2007 | Holland et al. | 714/5.11 |
| 7,230,791 B1 | 6/2007 | Ostwald et al. | |
| 7,461,099 B1 | 12/2008 | Sharpe et al. | |
| 7,529,816 B2 * | 5/2009 | Hayden et al. | 709/220 |
| 7,876,525 B2 | 1/2011 | Wilkin et al. | |
| 8,250,088 B2 * | 8/2012 | Bondurant et al. | 707/765 |
| 8,305,706 B2 | 11/2012 | Kerns et al. | |
| 2003/0147174 A1 | 8/2003 | Brace et al. | |
| 2003/0193737 A1 | 10/2003 | White et al. | |
| 2004/0078654 A1 * | 4/2004 | Holland et al. | 714/13 |
| 2005/0057847 A1 | 3/2005 | Armagost et al. | |
| 2005/0152061 A1 | 7/2005 | Hoelsaeter | |
| 2005/0231846 A1 | 10/2005 | Winarski et al. | |
| 2005/0267920 A1 * | 12/2005 | Helliker et al. | 707/204 |
| 2006/0010285 A1 | 1/2006 | Georgis | |
| 2006/0250766 A1 | 11/2006 | Blaalid et al. | |
| 2007/0219948 A1 | 9/2007 | Bugovics | |
| 2007/0236826 A1 | 10/2007 | Starr | |
| 2008/0010324 A1 | 1/2008 | Stebner et al. | |
| 2008/0109622 A1 * | 5/2008 | Yagawa et al. | 711/162 |
| 2008/0273261 A1 | 11/2008 | McIntosh et al. | |
| 2009/0019245 A1 | 1/2009 | Bondurant et al. | |
| 2009/0182789 A1 | 7/2009 | Sandorfi et al. | |
| 2011/0107039 A1 | 5/2011 | Bondurant et al. | |
| 2012/0078852 A1 * | 3/2012 | Haselton et al. | 707/654 |

* cited by examiner

METHODS FOR CONTROLLING REMOTE ARCHIVING SYSTEMS

CROSS-REFERENCES TO RELATED APPLICATIONS

This application is a continuation of U.S. patent application Ser. No. 12/199,448, filed Aug. 27, 2008, now issued as U.S. Pat. No. 8,250,088, on Aug. 21, 2012, and entitled "METHODS FOR CONTROLLING REMOTE ARCHIVING SYSTEMS," which claims priority to U.S. Provisional Application No. 60/977,787, filed Oct. 5, 2007, the contents of all of which are hereby incorporated in their entirety by reference.

BACKGROUND

Embodiments of the disclosure generally relate to storage systems and, more specifically, but not by way of limitation, to archiving storage systems.

An archiving storage system is used by one or more applications or application servers to store data for longer periods of time, for example, one year. Governments and other organizations often require the storage of certain types of data for long periods. For example, the Securities and Exchange Commission (SEC) may require retention of financial records for three or more years. Thus, entities that have to meet these storage requirements employ archiving systems to store the data to a media allowing for long-term storage.

Generally, larger organizations with two or more locations may have more than one archiving system. For example, a company may have an office in San Francisco with an archiving system and an office in New York with an archiving system. Each archiving system can store data locally. This configuration however does not permit a consistent storage archive across the organization as each archiving system manages only local data. Thus, these organizations often do not have control over the data that is stored across the organization.

It is in view of these and other considerations not mentioned herein that the embodiments of the present disclosure were envisioned.

BRIEF DESCRIPTION OF THE DRAWINGS

The embodiments of the present disclosure are described in conjunction with the appended figures.

Figure 1:
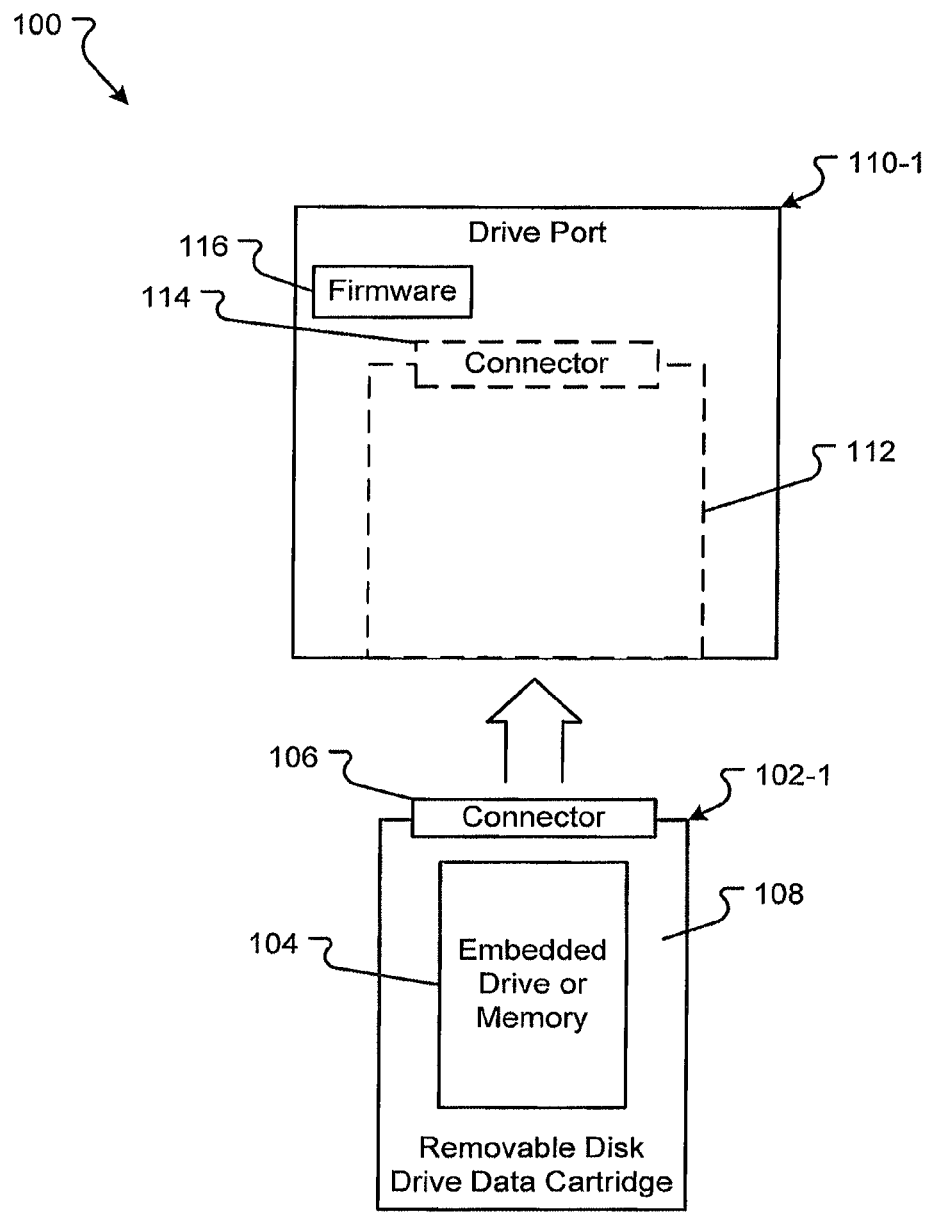
FIG. 1 is a block diagram of an embodiment of a removable cartridge storage system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Embodiments of the present disclosure provide a unique and novel archiving system. Embodiments include an archiving system having two or more network storage systems. The network storage systems, in embodiments, include removable hard disk drives embedded in removable disk cartridges, referred to simply as removable disk drives. The removable disk drives allow for expandability and replacement such that the archiving system need not be duplicated to add new or more storage capacity. Further, the removable disk drives provide advantages in speed and data access because, in embodiments, the data is stored and retrieved by random access rather than sequential access. In embodiments, the archiving system accesses, writes, reads, or performs functions on data in one network storage system from another remote network storage system.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

An embodiment of a removable disk system 100 to provide long-term archival data storage is shown in FIG. 1. A removable disk drive 102-1 provides storage capability for the removable disk system 100. In embodiments, the removable disk drive 102-1 includes a data cartridge case 108 and an embedded memory 104, which may be an embedded hard disk drive (HDD), solid state disk (SSD), solid state drive, or flash memory. The HDD, SDD, or flash memory 104 provides a random access memory for storage of archived data. The embedded memory 104 is in communication with and/or electrically connected to a connector 106. In one embodiment, the connector is a Serial Advanced Technology Attachment (SATA) connector. In other embodiments, the connector is a Universal Serial Bus (USB) connector, parallel connector, Firewire connector, or other connector. Both the embedded memory 104 and connector 106 are, in embodiments, physically attached to the data cartridge case 108, and, in some embodiments, enclosed, protected, connected or integrated by the data cartridge case 108. In other embodiments, the embedded memory 104 and the connector 106 are a physically integrated component and the connector protrudes from the data cartridge case 108. The data cartridge case 108, in embodiments, provides a solid container for the embedded memory 104 that also functions as an easily swappable or changed case when interchanging removable disk drives 102-1 in the removable disk system 100.

The embedded memory 104, in embodiments, is not physically destroyed with ease and is reusable if the data in the memory is removed, erased, altered, or changed. For example, the removable disk drive 102-1 is a hard drive that includes a magnetic media. To destroy the data, the magnetic media may need to be removed and destroyed in an industrial shredder or other device that physically destroys the media. However, in embodiments, the data on the hard drive could be altered and the hard drive reused without allowing the data to be retrieved.

In embodiments, the removable disk system 100 contains a drive port 110-1 that includes one or more data cartridge ports 112, each with a data cartridge connector 114 to receive the removable disk drive 102-1. The data cartridge connector 114 mates with the electrical connector 106 of the removable disk drive 102-1 to provide an electrical connection to the removable disk drive 102-1 and/or to communicate with the embedded memory 104 in the removable disk drive 102-1. As with the electrical connector 106, the data cartridge connector 114 may be a SATA connector or another type of connector. Regardless, the data cartridge connector 114 and the electrical connector 106 can be physically and/or electrically connected. The data cartridge port 112 allows the data cartridge case 108 of the removable disk drive 102-1 to be easily inserted and removed as necessary. In embodiments, the drive port 110-1 includes two or more data cartridge ports 112 to allow for the use, control and communication with two or more removable disk drives 102-1. Each drive port 110-1, in embodiments, is separately addressable to allow for customized control over each removable disk drive 102-1 connected to each data cartridge port 112. Thus, as removable disk drives 102-1 are replaced, the same controls can be applied to the newly inserted removable disk drives 102-1 because the drive port 110-1 is addressed instead of the removable disk drives 102-1.

The embedded memory 104 may be read and used by the firmware 116 of the drive port 110-1. The firmware 116 may be hardware and/or software resident in the drive port 110-1 for controlling the removable disk drive 102-1. In embodiments, the firmware 116 contains the necessary software and/or hardware to power-up the removable disk drive 102-1, spin-up the disk platters in the embedded memory 104, read and write to the embedded memory 104, read, write and process metadata, etc. For example, the firmware 116 could read the embedded memory 104 to identify the removable disk drive 102-1 and gather information related to the contents of the data.

In embodiments, the removable disk system 100 operates to receive one or more removable disk drives 102-1 in the one or more drive ports 110-1. The electrical connector 106 physically connects or couples with the data cartridge connector 114 to form an electrical connection that allows the drive port 110-1 to communicate with the embedded memory 104. The firmware 116 powers-up the embedded memory 104 and begins any initialization processes (e.g., security processes, identification processes, reading and/or writing, etc.). The drive port 110-1, which, in embodiments, is in communication with a network, receives archival data from one or more servers, applications, or other devices or systems on the network. The firmware 116 writes the archival data to the embedded memory 104 of the removable disk drive 102-1 to archive the data.

Figure 2:
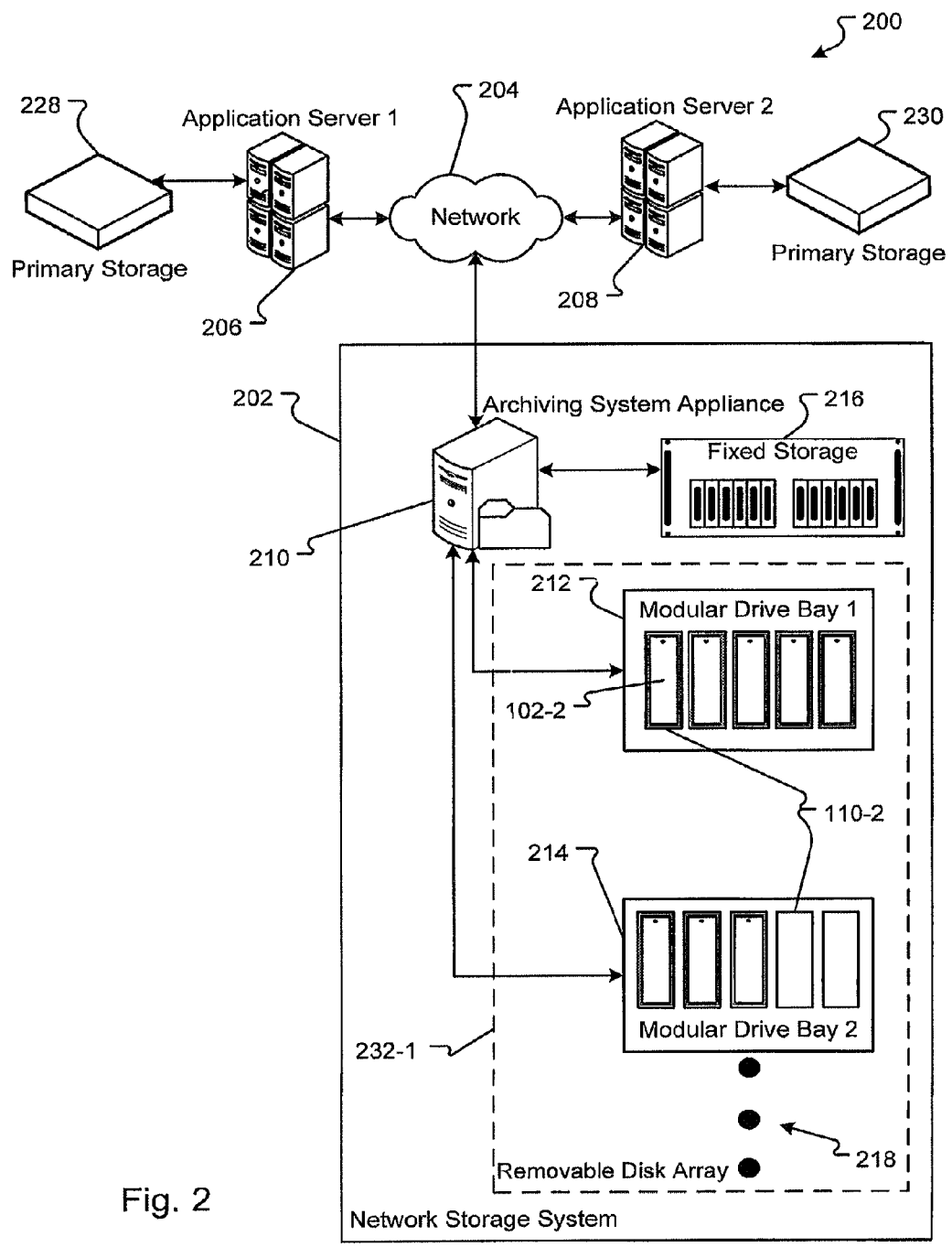
FIG. 2 is a hardware block diagram of an embodiment of an archiving system including one or more removable cartridge storage systems.

An embodiment of the hardware architecture of an archiving system 200 is shown in FIG. 2. The archiving system 200, in embodiments, comprises a network storage system 202 in communication with one or more systems via a network 204. In embodiments, the systems that communicate with the network storage system 202 comprise applications, application servers, other servers, peripherals, other devices and other systems that archive data on the network storage system 202. For example, application server 1 206 and/or application server 2 208 store archival data on the network storage system 202. An application server 206 or 208 may be an application, peripheral device, system, network component, or other software function or hardware device that may store archived data. Hereinafter, all functions, systems, processes, hardware devices that may store archived data will be referred to as an application or application server 206 and/or 208. Application server 1 206 and application server 2 208 will hereinafter be used to describe the functions of the archiving system 200 but are not meant to limit the description to the exemplary embodiments set forth herein.

The network storage system 202 comprises one or more components that may be encompassed in a single physical structure or be comprised of discrete components. In embodiments, the network storage system 202 includes an archiving system appliance 210 and one or more removable disk drives 102-2 connected or in communication with a drive port 110-2. In alternative embodiments, a modular drive bay 212 and/or 214 includes two or more drive ports 110-2 that can each connect with a removable disk drive 102-2. Thus, the modular drive bays 212 and 214 provide added storage capacity because more than one removable disk drive 102-2 can be inserted and accessed using the same archiving system appliance 210. Further, each drive port 110-2 in the modular drive bays 212 and 214 are, in embodiments, separately addressable allowing the archiving system appliance 210 to configure the removable disk drives 102-2 in the modular drive bays 212 and 214 into groups of one or more removable disk drives 102-2. Two or more modular drive bays 212 and 214, in embodiments, are included in the network storage system 202, as evidenced by the ellipses 218. Thus, as more data storage capacity is required, more modular drive bays 212 and 214 may be added to the network storage system 202.

The exemplary hardware architecture in FIG. 2 provides near limitless capacity as more removable disk drives 102-2 can be added to existing modular drive bays 212 or 214 until the modular drive bays 212 and 214 hold all possible removable disk drives 102-2. Then, more modular drive bays 212 and 214 are added to the network storage system 202. Further, removable disk drives 102-2 may be replaced as the removable disk drives 102-2 near their storage capacity. The removed disk drives 102-2, in embodiments, are physically stored if and until the data on the removable disk drives 102-2 needs to be retrieved. If the data on the removable disk drive 102-2 needs to be retrieved, the removable disk drive 102-2 may be inserted into one of the drive ports 110-2 of the modular drive bay 212 or 214, and the information retrieved from the connected removable disk drive 102-2.

The archiving system appliance 210, in embodiments, is a server operating as a file system. The archiving system appliance 210 may be any type of computing system having a processor and memory and operable to complete the functions described herein. An example of a server that may be used in the embodiments described herein is the PowerEdge™ 2950 Server offered by Dell Incorporated of Austin, Tex. The file system executing on the server may be any type of file system, such as the NT File System (NTFS), that can complete the functions described herein.

In embodiments, the two or more modular drive bays 212 and/or 214, having each one or more inserted removable disk drives 102-2, form a removable disk array (RDA) 232-1. The archiving system appliance 210 can configure the RDA 232-1 into one or more independent file systems. Each application server 206 or 208 requiring archiving of data may be provided a view of the RDA 232-1 as one or more independent file systems. In embodiments, the archiving system appliance 210 logically partitions the RDA 232-1 and logically associates one or more drive ports 110-2 with each application layer partition. Thus, the one or more removable disk drives 102-2 comprising the application layer partition appears as an independent file system.

In further embodiments, the archiving system appliance 210 provides an interface for application server 1 206 and application server 2 208 that allows the application servers 206 and 208 to communicate archival data to the archiving system appliance 210. The archiving system appliance 210, in embodiments, determines where and how to store the data to one or more removable disk drives 102-2. For example, the application server 1 206 stores archival data in a first application layer drive, such as, the first three removable disk drives. The application layer drives are, in embodiments, presented to the application servers 206 and 208 as application layer drives where write and read permissions for any one application layer drive is specific to one of the application servers. As such, the network storage system 202 provides a multiple and independent file system to each application server 206 and 208 using the same hardware architecture. In embodiments, the archival data is also referred to as an information element and may include, but is not limited to, a file, a memory sector, a data structure, a table, or other type or format of data.

In alternative embodiments, the network storage system 202 also comprises a fixed storage 216. The fixed storage 216 may be any type of memory or storage media either internal to the archiving system appliance 210 or configured as a discrete system. For example, the fixed storage 216 is a Redundant Array of Independent Disks (RAID), such as the Xtore XJ-SA12-316R-B from AIC of Taiwan. The fixed storage 216 provides an active archive for storing certain data for a short period of time where the data may be more easily accessed. In embodiments, the archiving system appliance 210 copies archival data to both the fixed storage 216 and the removable disk drive 102-2. If the data is needed in the short term, the archiving system appliance 210 retrieves the data from the fixed storage 216.

The archiving system appliance 210 can also configure the active archive in the fixed storage 216 into one or more independent file systems, as with the RDA 232-1. As explained above, each application server may be provided a view of one of two or more independent file systems. Each independent file system may comprise an application layer partition in the RDA 232-1 and a related application layer partition in the fixed storage 216. In embodiments, the archiving system appliance 210 partitions the fixed storage 216 and associates each application layer partition in the fixed storage 216 with an associated application layer partition in the RDA 232-1.

As explained above, the archiving system appliance 210, in embodiments, determines where and how to store the data to one or more removable disk drives 102-2. For example, the application server 1 206 stores archival data in a first application layer drive, which may include storing the archival data in the application layer partition in the fixed storage 216 for easier access to the archival data. Again, the application layer drives are, in embodiments, presented to the application servers 206 and 208 where write and read permissions for any one application layer drive is specific to one of the application servers. As such, the network storage system 202 provides a multiple and independent file system to each application server 206 and 208 using the same hardware architecture.

In operation, application server 1 206 stores primary data into a primary storage 228, which may be a local disk drive or other memory. After some predetermined event, the application server 1 206 reads the primary data from the primary storage 228, packages the data in a format for transport over the network 204 and sends the archival data to, the network storage system 202 to be archived. The archiving system appliance 210 receives the archival data and determines where the archival data should be stored. The archival data, in embodiments, is then sent to the related application layer partitions in both the fixed storage 216 and the RDA 232-1, which may comprise one or more of the removable disk drives 102-2 in one or more of the drive ports 110-2. The archival data is written to the removable disk drive 102-2 for long-term storage and is written to the fixed storage 216 for short-term, easy-access storage. In further embodiments, application server 2 208 writes primary data to a primary storage 230 and also sends archival data to the network storage system 202. In some embodiments, the archival data from application server 2 208 is stored to a different removable disk drive 102-2 and a different portion of the fixed storage 216 because the archival data from application server 2 208 relates to a different application and, thus, a different application layer partition.

Figure 3:
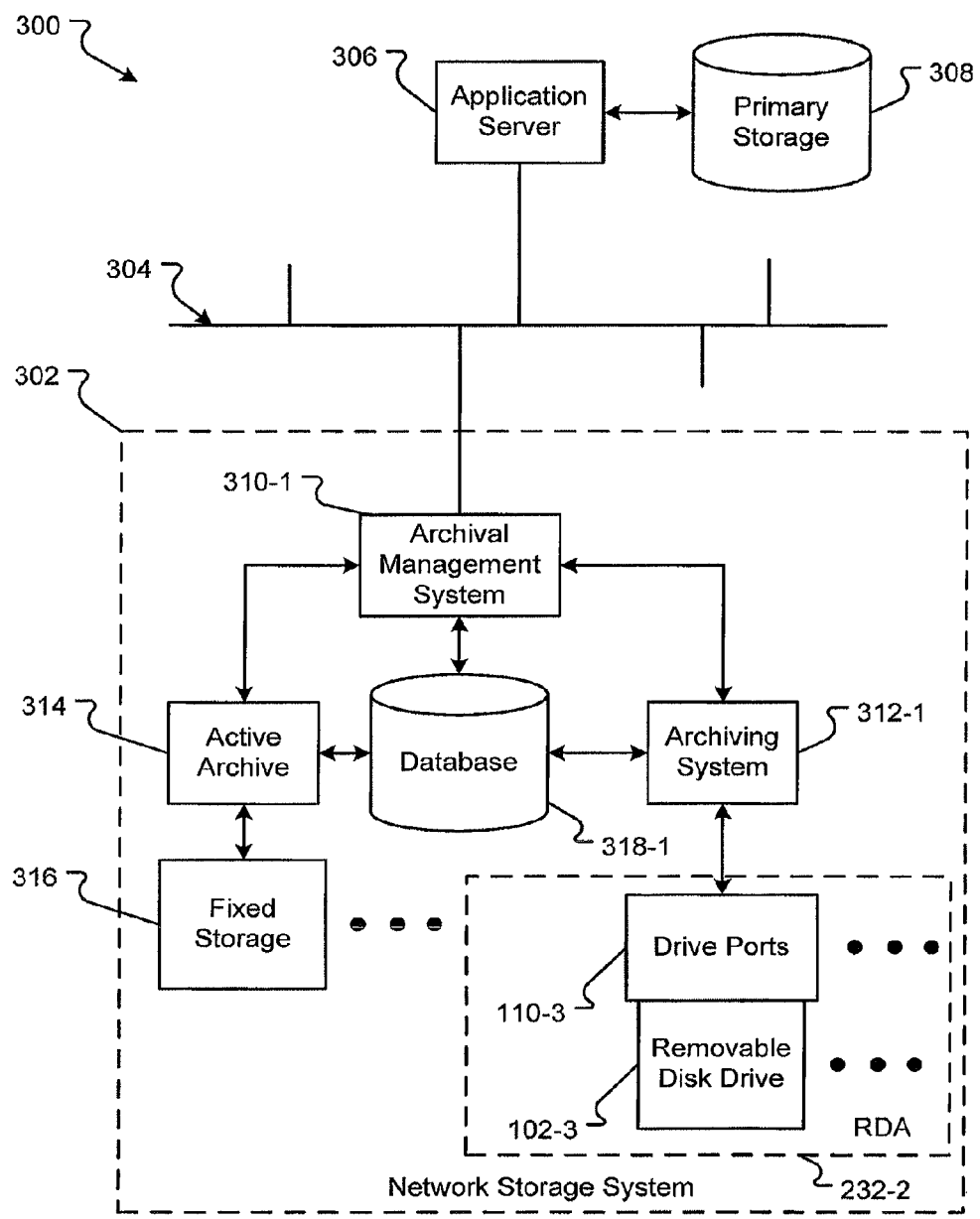
FIG. 3 is a functional block diagram of an embodiment of an archiving system.

A block diagram of an archiving system 300 is shown in FIG. 3. The archiving system 300 has one or more functional components that, in embodiments, includes a network storage system 302 in communication with a network 304. The network 304 may be any type of communication infrastructure, for example, one or more of, but not limited to, a wide-area network (WAN), local area network (LAN), wireless LAN, the Internet, etc. The network storage system 302 may communicate with one or more other systems coupled to, connected to or in communication with the network 304. For example, the network storage system 302 communicates with an application server 306. Communications between systems on the network 304 may occur by any protocol or format, for example, Transmission Control Protocol/Internet Protocol (TCP/IP), Hyper Text Transfer Protocol (HTTP), etc.

The network storage system 302, in embodiments, comprises one or more functional components embodied in hardware and/or software. In one embodiment, the network storage system 302 comprises an archiving system 312-1 in communication with one or more drive ports 110-3 that are in communication with one or more removable disk drives 102-3. The drive ports 110-3 and removable disk drives 102-3 are similar in function to those described in conjunction with FIG. 1. The archiving system 312-1 controls the function of the one or more drive ports 110-3 and writes the archived data to one or more predetermined removable disk drives 102-3 in the one or more drive ports 110-3.

In further embodiments, the network storage system 302 comprises an archival management system 310-1. The archival management system 310-1 receives data for archiving from one or more systems on the network 304. Further, the archival management system 310-1 determines to which system or removable disk drive 102-3 the data should be archived, in which format the data should be saved, and how to provide security for the network storage system 302. In embodiments, the archival management system 310-1 provides a partitioned archive such that the network storage system 302 appears to be an independent file system to each separate application server 306, yet maintains the archive for multiple application servers 306. Thus, the archival management system 310-1 manages the network storage system 302 as multiple, independent file systems for one or more application servers 306. In embodiments, the archival management system 310-1 and the archiving system 312-1 are functional components of the archiving system appliance 210 (FIG. 2).

In embodiments, the archival management system 310-1 saves archival data to both the archiving system 312-1 and an active archive 314. The active archive 314, in embodiments, controls, reads from and writes to one or more fixed storage devices 316 that allow easier access to archived data. In embodiments, fixed storage 316 is similar in function to fixed storage 216 (FIG. 2). The active archive 314 performs similar functions to the archiving system 312-1 but for the fixed storage devices 316. In embodiments, the active archive 314 and the fixed storage devices 316 are components of the hardware fixed storage system 216 (FIG. 2). In alternative embodiments, the active archive 314 partitions the fixed storage 316 to mirror the associated application layer partitions in the RDA 232-2. The application layer partition(s) in the active archive 314 may have boundaries associated with memory addresses in the fixed storage 316.

The archival management system 310-1 may also provide an intelligent storage capability. Each type of data sent to the network storage system 302 may have different requirements and controls. For example, certain organizations, such as the SEC, Food and Drug Administration (FDA), European Union, etc., have different requirements for how certain data is archived. The SEC may require financial information to be kept for seven (7) years while the FDA may require clinical trial data to be kept for thirty (30) years. Data storage requirements may include immutability (the requirement that data not be overwritten), encryption, a predetermined data format, retention period (how long the data will remain archived), etc. The archival management system 310-1 can apply controls to different portions of the RDA 232-2 and the active archive 314 according to user-established data storage requirements. In one embodiment, the archival management system 310-1 creates application layer partitions in the archive that span one or more removable disk drives 102-3 and one or more portions of the fixed storage 316. All data to be stored in any one application layer partition can have the same requirements and controls. Thus, requirements for data storage are applied to different drive ports 110-2 (FIG. 2) in the modular drive bays 212 and 214 (FIG. 2) and to the removable disk drives 102-2 (FIG. 2) stored in those drive ports 110-2 (FIG. 2). Further, the requirements are likewise applied to different portions of the fixed storage 316 in the active archive 314. If a removable disk drive 102-3 is replaced, the same storage requirements, in embodiments, are applied to the replacement removable disk drive 102-3 because of its location in the controlled drive port 110-3. As such, the archival management system 310-1 can individually maintain separate sets of data using different controls, even in different removable disk drives.

The network storage system 302 may also comprise a database 318-1 in communication with the archival management system 310-1. The database 318-1 is, in embodiments, a memory for storing information related to the data being archived. The database 318-1 may include HDDs, ROM, RAM or other memory either internal to the network storage system 302 and/or the archival management system 310-1 or separate as a discrete component addressable by the archival management system 310-1. The information stored in the database 318-1, in embodiments, includes one or more of, but is not limited to, data identification, application server identification, time of storage, removable disk drive identification, data format, encryption keys, application layer partition organization, etc.

The network 304, in embodiments, connects, couples, or otherwise allows communications between one or more other systems and the network storage system 302. For example, the application server 306 is connected to the network storage system 302 via the network 304. The application server 306 may be a software application, for example, an email software program, a hardware device, or other network component or system. The application server 306, in embodiments, communicates with a memory that functions as the application server's primary storage 308. The primary storage 308 is, in embodiments, a HDD, RAM, ROM, or other memory either local to the application server 306 or in a separate location that is addressable.

In embodiments, the application server 306 stores information to the primary storage 308. After some predetermined event, such as the expiration of some period of time, the application server 306 sends data to the network storage system 302 to archive the data. The application server 306 may send the data by any network protocol, such as TCP/IP, HTTP, etc., over the network 304 to the network storage system 302. The data is received at the archival management system 310-1. The archival management system 310-1, in embodiments, sends the data to one or both of the active archive 314 and/or the archiving system 312-1 to be archived.

Figure 4:
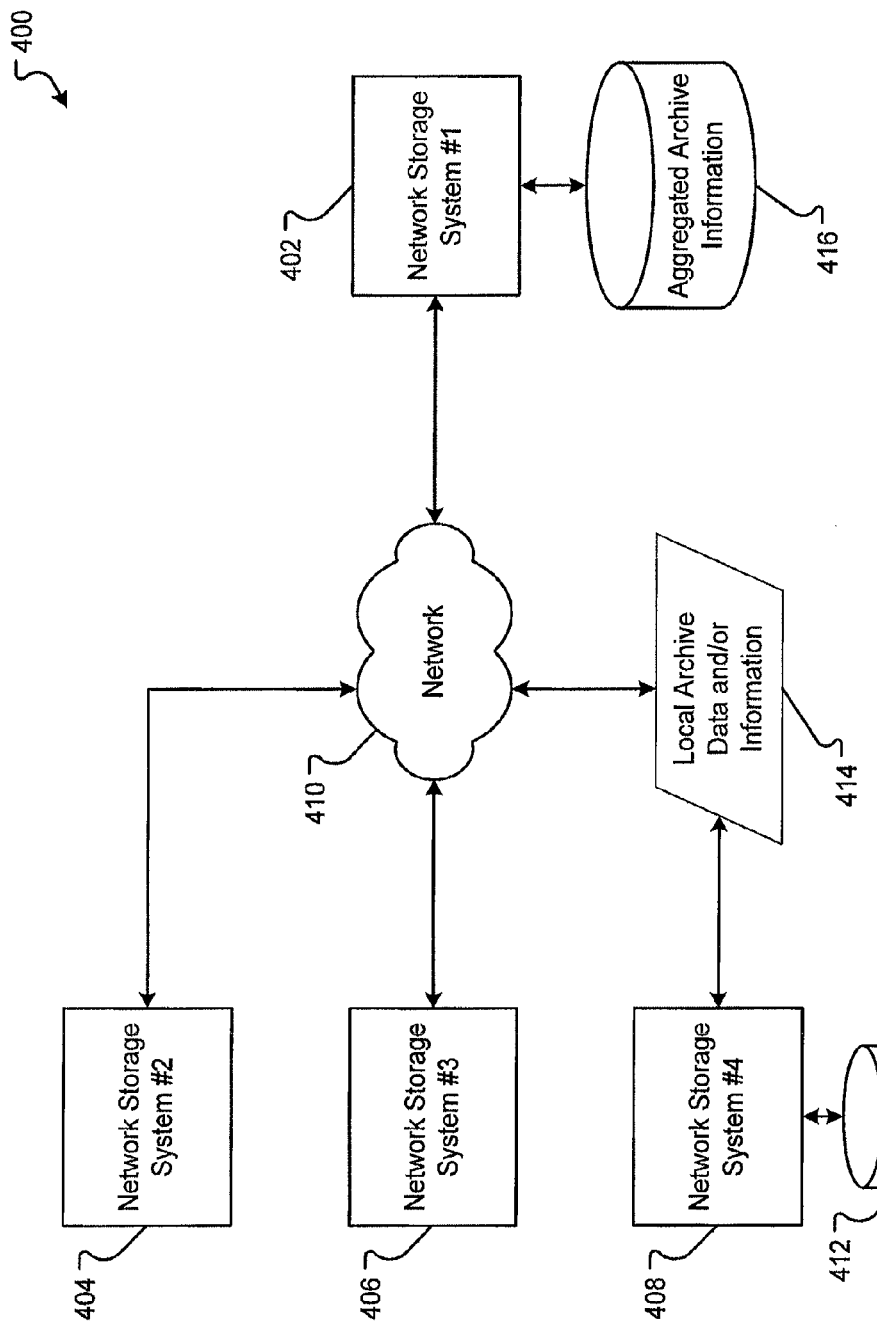
FIG. 4 is a block diagram of an embodiment of a networked archiving system having central control.

An embodiment of a networked archiving system 400 is shown in FIG. 4. The archiving system 400, in embodiments, comprises two or more network storage systems. In the example shown in FIG. 4, the archiving system 400 includes network storage system #1 402, network storage system #2 404, network storage system #3 406, and network storage system #4 408. The two or more network storage systems 402, 404, 406, and 408 may be the same or similar to network storage system 302 (FIG. 3). In embodiments, the two or more network storage systems 402, 404, 406, and 408 are in communication with each other over a network 410. The network 410 may be a wired network, wireless network, LAN, WAN, Internet, or other network facilitating the communication between network storage systems.

In embodiments, one of the two or more network storage systems 402, 404, 406, and 408 is a primary network storage system. For example, network storage system #1 402 is the primary network storage system. The primary network storage system 402 can control, direct, change, or request operations of the other network storage systems 404, 406, and 408 in the archiving system 400. In one embodiment, the primary network storage system 402 maintains a database 416 containing information, archived data, metadata, or other data from one or more of the other network storage systems 404, 406, and 408. An administrator or other user may access the aggregated data in the database 416 through the primary network storage system 402 or, in alternative embodiments, by a request to the primary network storage system 402 from one of the other network storage systems 404, 406, and 408. The primary network storage system 402 may send requests for data or information to any other network storage system 404, 406, and 408 and receive response from the network storage systems 404, 406, and 408. In further embodiments, the network storage systems 404, 406, and 408 may also send requests to and receive response from the primary network storage system 402 or any other of the network storage system.

The aggregated archive data can allow the primary network storage system 402 to identify all the archival data in the archiving system 400. To aggregate data, the primary network storage system 402 sends a request for new or updated data to one or more of the other network storage systems 404, 406, and 408. For example, the primary network storage system 402 sends a request for data to the network storage system #4 408. The network storage system #4 408, in embodiments, accesses the local archive 412, which may be the RDA 232-2 (FIG. 3), active archive 314 (FIG. 3), or database 312 (FIG. 3) associated with the network storage system #4 408. The network storage system #4 408 can read and retrieve the requested data for transport to the primary network storage system 402. The network storage system #4 408 sends the data 414 to the primary network storage system 402. Upon receiving the data 414, the primary network storage system 402, in embodiments, stores the data into the aggregated archive information database 416. The request may be for a portion or all data in the remote network storage system's local archive 412.

Figure 5:
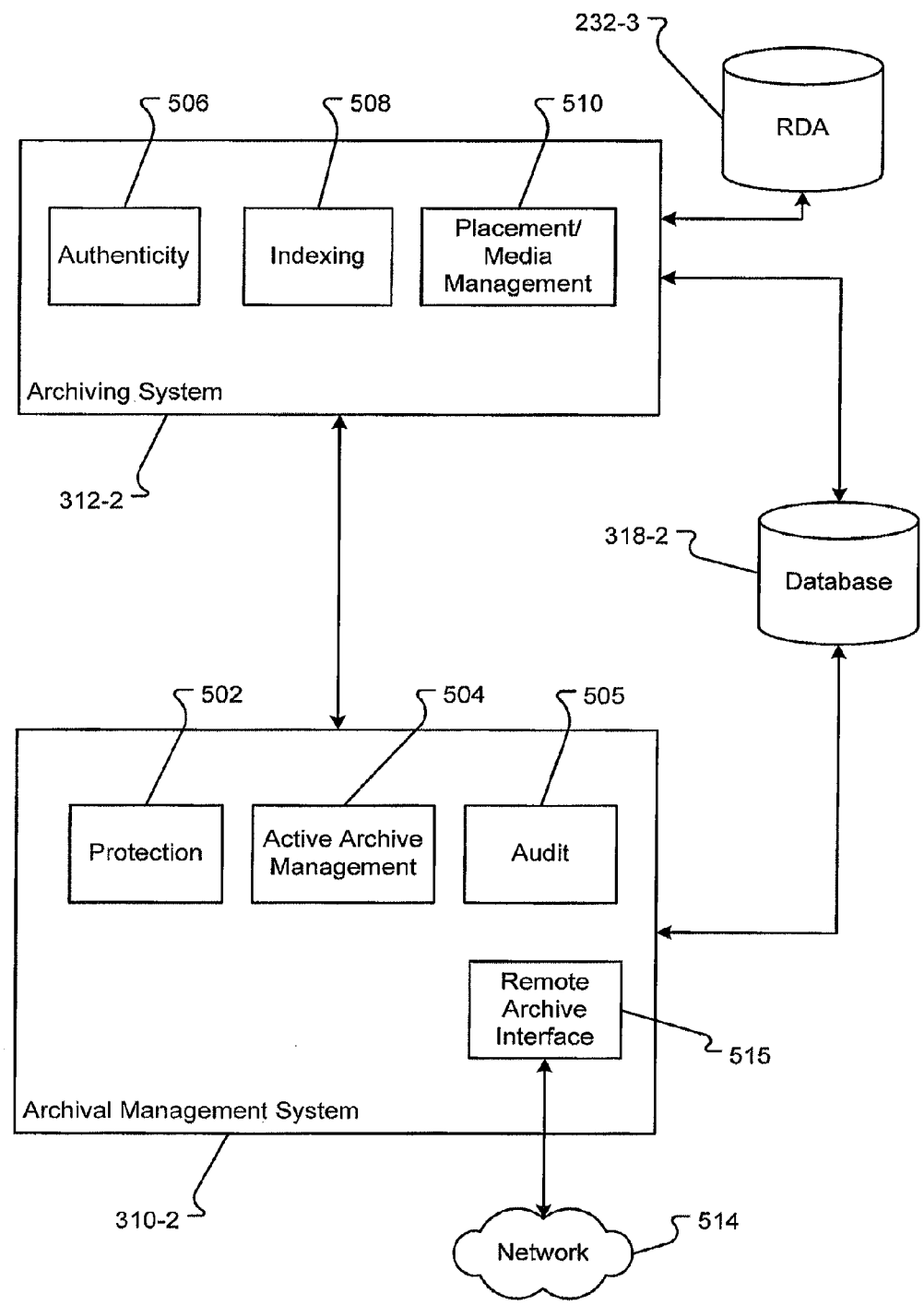
FIG. 5 is a set of block diagrams of embodiments of an archival management system and an archiving system.

Embodiments of an archival management system 310-2 and an archiving system 312-2, including one or more components or modules, are shown in FIG. 5. In embodiments, the archival management system 310-2 comprises one or more of a protection module 502, an active archive management module 504, an audit module 505, and a remote archive interface module 514. In embodiments, the protection module 502 protects access to the network storage system 302 (FIG. 3) by applications, application servers, or other components on the network. For example, the protection module 502 prohibits a user from accessing the network storage system 302 if the network storage system 302 is a closed system. Thus, the protection module 502 may authenticate a system, determine access rights of the system, perform decryption of data, and other processes.

The active archive management module 504, in embodiments, manages data written to and read from the active archive 314 (FIG. 3). In embodiments, the active archive management module 504 determines if archival data should be written to the active archive 314 (FIG. 3) based on information provided by the application server or on information stored in the database 318-2. In further embodiments, the active archive management module 504 determines when data in the active archive 314 (FIG. 3) is removed from the active archive 314 (FIG. 3). According to information in the database 318-2, one or more items of data may only reside in the active archive 314 (FIG. 3) for a predetermined period of time, for example, three months.

The audit module 505, in embodiments, stores data about the archival data stored in the archiving system 312-2 and active archive 314 (FIG. 3). In embodiments, the audit module 505 records information, for example, the application server that sent the data, when the data was received, the type of data, where in the archiving system 312-2 the data is stored, where in the active archive 314 (FIG. 3) the data is stored, the period of time the data will be stored in the active archive 314 (FIG. 3), etc. The audit module 505 can provide a "chain of custody" for the archived data by storing the information in the database 318-2.

In embodiments, the remote archive interface module 515 sends or receives data, inputs and/or actions, over the network 514, to another network storage system in the archiving system. For example, a system may request data stored at a distantly located network storage system. The request can be sent to the remote network storage system using the remote archive interface 515. Likewise, the remote archive interface module 515 may receive or send data, inputs, and/or actions sent from or sent to remote network storage systems over the network 514.

The archiving system 312-2, in embodiments, includes one or more of an authenticity module 506, an indexing module 508, and/or a placement/media management module 510. In embodiments, the authenticity module 506 determines if a removable disk drive is safe to connect with the archiving system 312-2. For example, the authenticity module 506 may complete an authentication process, such as, AES 256, a public-key encryption process, or other authentication process, using one or more keys to verify that the inserted removable disk drive has access to the archiving system 312-2. In embodiments, the authenticity module 506 saves any authentication information for a removable disk drive to the local database 318-2 when the removable disk drive is first created. This authentication information, in embodiments, remains locally stored to protect the information. In embodiments, the authenticity module 506, upon a request for the authentication information received at the remote archive interface 515, reads the authentication information from the database 318-2 and sends the authentication information to the remote archive interface 515 for transport of a network 514.

The indexing module 508, in embodiments, creates application layer partitions in the RDA 232-3 to provide storage areas for different data. For example, the indexing module 508 selects one or more removable disk drives to form one or more "drives". "Drive A:\" may comprise one or more removable disk drives, while "Drive BA" and "Drive C:\" may also include one or more removable disk drives. In embodiments, each drive is associated with an application layer partition of the RDA 232-3. There may be fewer than three application layer partitions of the RDA 232-3 or more than three application layer partitions of the RDA 232-3. In embodiments, each drive or application layer partition stores only a predetermined type of data that relates to one or more application servers. For example, Drive A:\ stores email data, while Drive B:\ stores Health Insurance Portability and Accountability Act (HIPAA) data.

In further embodiments, the active archive management module 504 creates application layer partitions in the active archive 314 (FIG. 3) that are associated with the application layer partitions in the RDA 232-3. For example, the active archive management module 504 selects portions of the active archive 314 (FIG. 3) to form one or more "drives" that are associated with the drive(s) in the RDA 232-3. In embodiments, the active archive's "Drive A:\" is associated with Drive A:\ in the RDA 232-3, while "Drive B:\" and "Drive C:\" also are associated with Drive B:\ and Drive C:\, respectively, in the RDA 232-3. In embodiments, each active archive drive is associated with an application layer partition of the active archive 314 (FIG. 3). There may be fewer than three application layer partitions of the active archive 314 (FIG. 3) or more than three application layer partitions of the active archive 314 (FIG. 3). In embodiments, each drive or application layer partition stores the same type of data as the application layer partitions in the RDA 232-3. Continuing the example above, Drive A:\ stores email data, while Drive B:\ stores clinical trial data, which is the same as the application layer partitions in the RDA 232-3.

The application server(s) 206 and 208 (FIG. 2) can view the application layer partitions in both the active archive 314 and the RDA 232-3 and, as such, views the active archive 314 (FIG. 3) and the RDA 232-3 as a virtual archiving system with a separate, independent drive inside the active archive 314 (FIG. 3) and the RDA 232-3 for the application server. One application server may only access the one or more drives related to the data the application server archives and may not access other drives not associated with the data the application server archives.

In further embodiments, the active archive management module 504 provides controls for each drive in the active archive 314 (FIG. 3). How data is archived for one type of data may be different from how a second type of data is archived. For example, an organization (e.g., the SEC) may require email to be stored for seven (7) years while the Department of Health and Human Services (HHS) may require HIPAA data to be stored for six (6) months. The active archive management module 504 can manage each drive differently to meet the requirements for the data. For example, the active archive management module 504 may store email on drive A:\ for seven (7) years and store clinical trial data on drive B:\ for thirty (30) years. The active archive management module 504, in embodiments, stores information about which portions of the active archive 314 (FIG. 3) comprise the separate application layer partitions and enforce the controls on those portions of the active archive 314 (FIG. 3). Other controls enforced by the active archive management module 504 may include the format of data stored on a drive, whether data is encrypted in the active archive 314 (FIG. 3), when and how data is erased from the active archive 314 (FIG. 3), etc. In a further embodiment, the indexing module 508 performs the same or similar functions for the RDA 232-3.

In embodiments, the placement/media management module 510 manages the removable disk drives in the RDA 232-3. For example, the placement/media management module 510 determines when cartridges need replacing because the removable disk drive is at or near capacity. In embodiments, the placement/media management module 510 also separately addresses the removable disk drives and provides the addressing information to the indexing module 508 for storing data in the correct application layer partition.

Figure 6:
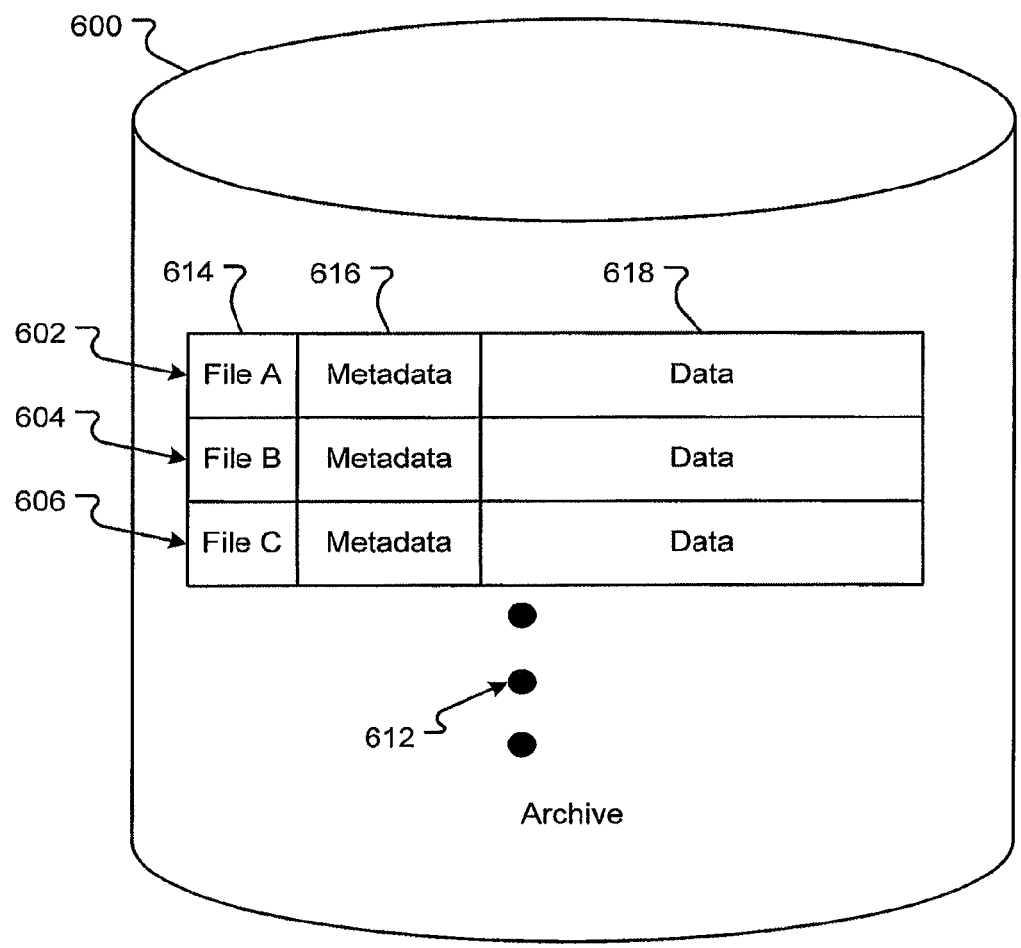
FIG. 6 is a block diagram of an embodiment of information elements stored in the network storage system archive.

An embodiment of an archive 600 having one or more data structures for one or more files is shown in FIG. 6. The archive 600 may represent the RDA 232 (FIG. 3) and/or the active archive 314 (FIG. 3). In the example presented in FIG. 6, there are three data structures 602, 604, and 606 that represent files stored in an archive 600. There may be fewer files than those shown in the exemplary archive 600 or one or more other files may exist in the archive 600 as represented by the ellipses 612.

In embodiments, a file data structure 602 may comprise a file identifier 614, file metadata 616, and file data 618. A file identifier 614 may be any identifier of the file, for example a file GUID. The file metadata 616, in embodiments, includes the information or attributes about the file, for example, the file size, file location, file save date and time, file creation date and time, file creator, etc. File data 618 can include the archived data sent from the application server.

In embodiments, one or more files may have been converted into stub files. In embodiments, a stub file has at least a portion of the file data eliminated. The archival management system 310-1 (FIG. 3) or the active archive system 314 (FIG. 3) may create the stub files. In one embodiment, the file data is replaced with a pointer, which provides a link or other information to retrieve the file from another location, for example, the RDA 232-1 (FIG. 2). In other embodiments, the file data is eliminated without replacing the file data with a pointer. Other parts of the file may also be eliminated, for example, the file metadata and/or the file identifier. If the file identifier or file metadata is eliminated, a record of the file, in embodiments, is recorded in the database 318-1 (FIG. 3) to ensure that the archival management system 310-1 (FIG. 3) does not search for the file in the archive 600.

Figure 7A:
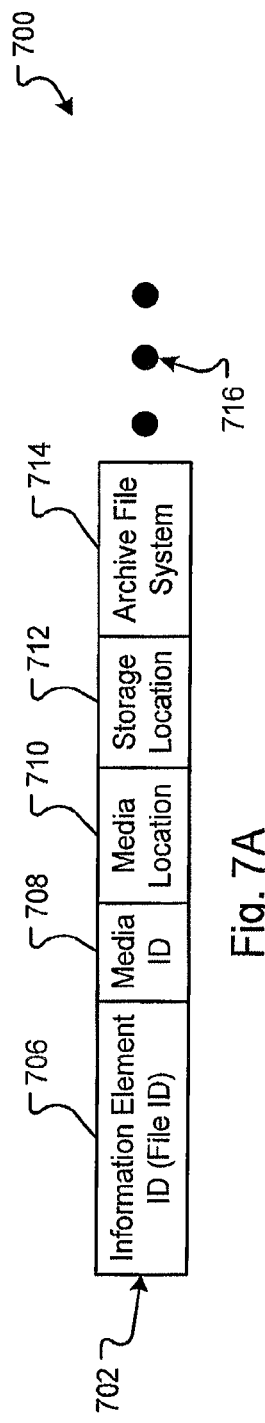
FIGS. 7A-C are block diagrams of embodiments of an archive datastore and metadata or other information stored about the archived data in the archiving system.
Figure 7B:
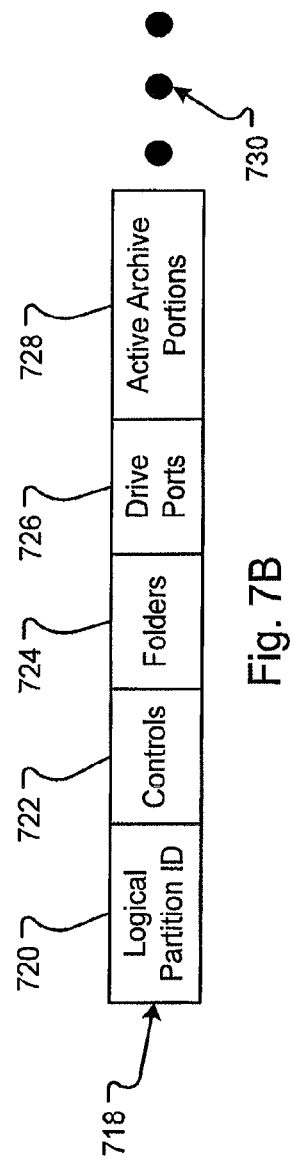
Figure 7C:
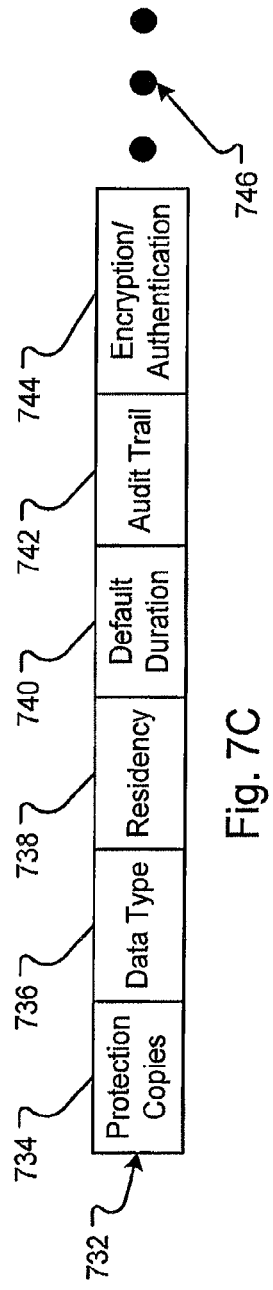

Embodiments of a database 700, similar or the same as database 318 (FIG. 3), comprising one or more data structures for storing information about the data in the RDA 232 (FIG. 2) and/or active archive 314 (FIG. 3) is shown in FIGS. 7A-C. The database 700 can be an archive table or other data structure for storing the information described herein. In an embodiment, the database 700 includes one or more data item fields 702 that represent the separate data items that are stored in the RDA and/or the active archive. There may be fewer or more than two data item fields 702 as represented by the ellipses 716. Each data item field 702 may have one or more fields representing data about the data items represented by the data item field 702.

In embodiments, a data item field 702 may comprise one or more of, but is not limited to, an information element identifier 706, a media identifier 708, a media location 710, a storage location 712 and/or an archive file system identifier 714. The information element identifier 706, in embodiments, includes an identification that can be used by the network storage system 202 (FIG. 2) to identify the data file or element of data that was stored in the RDA 232 (FIG. 2) or the active archive 314 (FIG. 3). The information element identifier 706 may also be referred to as a file identifier herein but does not limit the information element identifier 706 to identifying only files. The information element identifier 706 may identify any type of data structure. In one embodiment, the information element identifier 706 is a GUID for the data element. In another embodiment, the information element identifier 706 is a file name assigned to the data element. For example, data item field 702 represents data item 1, and the information element identifier 706 would be "file a". In other embodiments, the entity storing the data item in the network storage system 202 (FIG. 2) provides the file name that is stored in the information element identifier 706.

Further embodiments of the data item field 702 include a media identifier 708. In embodiments, the data is stored in one or more removable disk drives 102-2 (FIG. 2) and/or one or more locations in the active archive 314 (FIG. 3). The media identifier 708 may include a listing of the one or more removable disk drives 102-2 (FIG. 2) that store the data. Further embodiments also include at least an identification that the data is also stored in the active archive 314 (FIG. 3). The listing of the one or more removable disk drives 102-2 (FIG. 2) may be a list of identifiers that are both an electronic identifier and a physical identifier. For example, the electronic identifier, which is used by the processor of the network storage system 202 (FIG. 2) to identify the removable disk drive 102-2 (FIG. 2) is the same as the SKU printed on a label affixed to the removable disk drive 102-2 (FIG. 2) cartridge. In this way, the network storage system 202 (FIG. 2) may request the removable disk drive 102-2 (FIG. 2) from an administrator using the identifier. In other embodiments, electronic identifier and physical identifier are different but associated in a table in the media identifier field 708.

A media location field 710, in embodiments, records the location of the media. A removable disk drive 102-2 (FIG. 2) may be removed from a drive port 110-2 (FIG. 2) and physically stored in another location. The media location 710 can record the drive port 110-2 (FIG. 2) of where the media is inserted or should be inserted. For example, the media location field 710 stores the drive port number for the network storage system 202 (FIG. 2).

A storage location field 712 may include the physical storage location of the removed disk drive 102-2 (FIG. 2). For example, the media location field 710 includes the name of the storage entity, e.g., Acme Storage, a location for the storage location, e.g., Missoula, Mont., and/or a room or safe where the media is stored, e.g., Storage Room 109. In other embodiments, the storage location field 712 includes one or more memory addresses in a removable disk drive or in the active archive for where the data is stored.

A file system identifier 714, in embodiments, stores the file system used for the media. For example, the file system identifier 714 stores an identifier for the NTFS. The removable disk drives 102-2 (FIG. 2) may be removed from the network storage system 202 (FIG. 2) and physically stored for an extended period (years or decades). The file system used by the network storage system 202 (FIG. 2) when the data was stored may have changed. However, using the file system identifier 714, an upgraded network storage system 202 (FIG. 2) can load or use the older file system to retrieve information from the newly inserted removable disk drive 102-2 (FIG. 2).

In another embodiment, the archive file system identifier 714 is an identifier for the network storage system in the archiving system that created the removable disk drive. A removable disk drive, when first inserted, is formatted with information, such as authentication information. This information is stored locally at the network storage system that created the removable disk drive. To retrieve the authentication information, the network storage system that created the removable disk drive, in embodiments, needs to be known. As such, an identifier for each network storage system can be stored in the data element field 702. Thus, if the data about the file or information element is aggregated, the network storage system that created the removable disk drive will be known. In one embodiment, the archive file system identifier 714 is a GUID for the network storage system. In another embodiment, the archive file system identifier 714 is a name assigned to the network storage system. For example, network storage system #1 402 (FIG. 4) may have a GUID identifying network storage system #1 402 (FIG. 4) while network storage system #2 404 may have a different and unique GUID. The GUID can be stored in the archive file system identifier 714.

Further embodiments of the database 700 comprising one or more data structures for organizing an RDA into application layer partitions is shown in FIGS. 7B-7C. In embodiments, the database 700 is similar or the same as database 318-1 (FIG. 3). The database 700 can be a partition table or other data structure for storing the information described herein. In an embodiment, the database 700 includes one or more application layer partition fields 718 that represent the application layer partitions in the RDA of a network storage system. There may be fewer or more than two application layer partition fields as represented by the ellipses 730. Each application layer partition field 718 may have one or more fields representing data about the application layer partition represented by the application layer partition fields 718.

In embodiments, an application layer partition field 718 may comprise one or more of, but is not limited to, an application layer partition identification field 720, one or more control fields 722, one or more drive port fields 726, and/or an active archive portions field 728. In alternative embodiments, the application layer partition field 718 also includes one or more folder fields 724. The application layer partition identification field 720, in embodiments, includes an identification that can be used by an application server 210 (FIG. 2) to send data to the application layer partition represented by the application layer partition field 718. In one embodiment, the identification is a GUID for the application layer partition. In another embodiment, the identification is the drive letter assigned to the application layer partition. For example, application layer partition field 718 represents application layer partition 1, and the application layer partition identification field 720 would be drive letter "A:\".

Further embodiments of the application layer partition field 718 includes one or more drive port fields 726. In embodiments, the one or more drive port fields 726 associate one or more drive ports with the application layer partition. The association may include listing the one or more interface addresses for the one or more drive ports in the one or more drive port fields 726. In other embodiments, a drive port is assigned a slot number or identification. The slot number may then be stored in the drive port field 726. The drive port fields 726 can be used by the network storage system to address archival data to one or more removable disk drives electrically connected to the one or more drive ports. In embodiments, the portions of the active archive, which may be a set of memory addresses, offsets, etc., for which data is stored is stored in the active archive portions field 728.

One or more control fields 722 and one or more folder fields 724, in embodiments, are also included in the application layer partition field 718. The control fields 722 provide one or more controls for the application layer partition represented by the application layer partition field 718. Likewise, the folder fields 724 provide a designation of one or more folders that can be used for storing data in the application layer partition represented by the application layer partition field 718. Embodiments of the control fields 722 are further described in conjunction with FIG. 7C.

An embodiment of one or more control fields 732 is shown in FIG. 7C. The control fields 732 may include one or more of, but are not limited to, a protection copies field 734, a data type field 736, a residency field 738, a default duration field 740, an audit trail field 742, and an encryption/authentication field 744. There may be fewer or more than two control fields as represented by the ellipses 746. The protection copies field 734, in embodiments, includes a number of copies that are kept of the data. For example, if there is a two (2) in the protection copies field 734, two copies of the application layer partition or of the data within the application layer partition is maintained in the RDA 232 (FIG. 2).

The data type field 736, in embodiments, represents how the data is maintained. For example, the data type field 736 includes a designation that the data in the application layer partition is WORM data. As such, all data in the application layer partition is provided WORM protection. In alternative embodiments, the data type field 736 may also describe the type of data stored, such as, email data, HIPAA data, etc.

In embodiments, the residency field 738 is a set of memory addresses of where the data is stored in the RDA 232 (FIG. 2). Each set of data in the RDA 232 (FIG. 2) can have an identification that can be associated with a memory address, such as a memory offset. The default duration field 740, in embodiments, sets a duration for maintaining the data in the RDA. For example, an outside organization may require the data in the application layer partition to be maintained for six (6) months. The default duration field 740 is set to six months to recognize this limitation.

The audit trail field 742, in embodiments, is a flag that, if set, requires an audit trail to be recorded for the data. In embodiments, the audit trail includes a log or record of every action performed in the RDA 232 (FIG. 2) that is associated with the data. For example, the time the data was stored, any access of the data, any revision to the data, or the time the data was removed would be recorded in the audit trail. In other embodiments, the audit trail field 742 comprises the record or log of the audit trail.

In embodiments, the encryption field 744 comprises a flag of whether the data in the application layer partition is encrypted. If the flag is set, the data is encrypted before storing the data into the RDA. In alternative embodiments, the encryption field 744 also includes the type of encryption, for example, AES 256, the public key used in the encryption, etc., and/or the keys for encryption.

In alternative embodiments, the encryption/authentication field 744 also includes authentication information for the removable disk drive where the data is stored. As explained in conjunction with FIG. 7A, each removable disk drive is authenticated by the network storage system that creates the removable disk drive. The authentication may be by AES 256 or other authentication method. Regardless, any authentication information, such as keys, required for the authentication of the removable disk drive may be stored in the encryption field for the application layer partition or removable disk drive.

Figure 8:
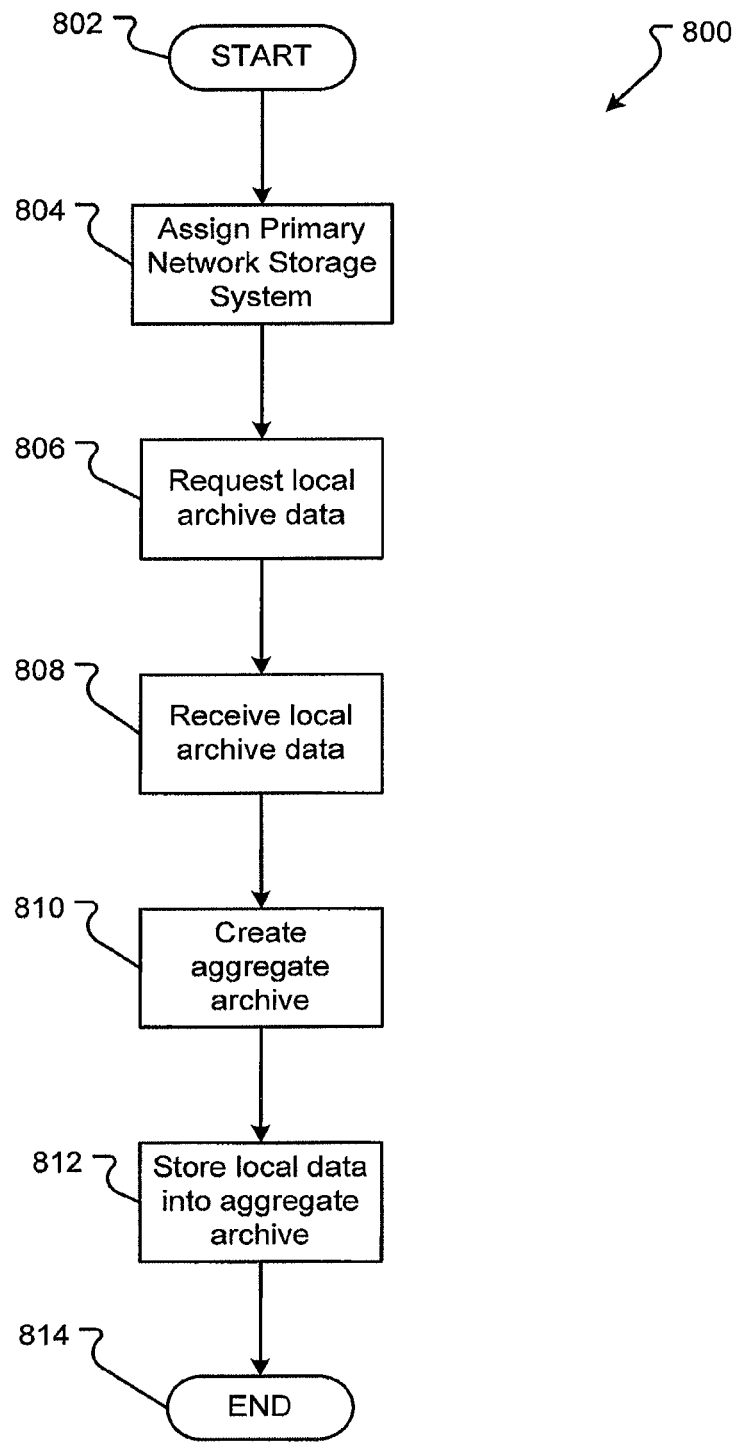
FIG. 8 is a flow diagram of an embodiment of a method for aggregating data across a networked archiving system.

An embodiment of a method 800 for aggregating data in an archiving system is shown in FIG. 8. In embodiments, the method 800 generally begins with a START operation 802 and terminates with an END operation 814. The steps shown in the method 800 may be executed in a computer system as a set of computer executable instructions. While a logical order is shown in FIG. 8, the steps shown or described can, in some circumstances, be executed in a different order than presented herein.

Assign operation 804 assigns the role of primary network storage system. In embodiments, the archiving system 400 (FIG. 4) has two or more network storage systems 402, 404, 406, and 408 (FIG. 4). One of the network storage systems 402, 404, 406, and 408 (FIG. 4) is assigned the role of primary network storage system 402. In one embodiment, the primary storage system is determined by vote of the network storage systems 402, 404, 406, and 408 (FIG. 4). In another embodiment, the administrator or user assigns the role of primary network storage system 402 (FIG. 4). To assign the role, an indicator, such as a flag or other data, is established and stored at the primary network storage system 402 (FIG. 4) establishing the primary network storage system 402 (FIG. 4). This data may be replicated to all other network storage systems 404, 406, and 408 (FIG. 4). In another embodiment, the other network storage systems 404, 406, and 408 (FIG. 4) are established as secondary or subordinate network storage systems. Regardless, all network storage systems 402, 404, 406, and 408 (FIG. 4) recognize the primary network storage system 402 (FIG. 4). If the primary network storage system 402 (FIG. 4) fails, one of the other network storage systems 404, 406, and 408 (FIG. 4) may become the primary network storage system by changing the data.

Request operation 806 requests local archive data. In embodiments, the primary network storage system 402 (FIG. 4) sends a request to one of the other network storage systems 404, 406, and 408 (FIG. 4) for archival data, metadata, or other information from the local archive 412 (FIG. 4) of the other network storage systems 404, 406, and 408 (FIG. 4). Receive operation 808 receives the response to the request for local archive data. In embodiments, the other network storage systems 404, 406, and 408 (FIG. 4) sends a packet 414 (FIG. 4) of data to the primary network storage system 402 (FIG. 4). The primary network storage system 402 (FIG. 4) can receive the packet 414 (FIG. 4) for further processing.

Create operation 810 creates an aggregate archive information datastore. In embodiments, the primary network storage system 402 (FIG. 4) has an existing local storage. The primary network storage system 402 (FIG. 4) can then partition or create new data structures either separate from the local storage or as part of the local storage to store aggregate data. As such, the primary network storage system 402 (FIG. 4) creates an aggregated archive information datastore 416 (FIG. 4). In embodiments, the primary network storage system 402 (FIG. 4) identifies the data from the other network storage systems 404, 406, and 408 (FIG. 4) with an archive file system identifier 714 (FIG. 7A).

Store operation 812 stores the received local archive data into the aggregate archive. In embodiments, the primary network storage system 402 (FIG. 4) stores the received archival data or information in the aggregated archive information datastore 416 (FIG. 4). The data may be stored with an identifier assigned to the remote network storage systems 404, 406, and 408 (FIG. 4) from which the data was received. In further embodiments, the aggregated archive information datastore 416 (FIG. 4) may be replicated or copied to one or more other network storage systems 404, 406, and 408 (FIG. 4). In embodiments, the aggregated archive information datastore 416 (FIG. 4) may be updated periodically, e.g. every day, every week, etc., or is updated as changes are made to any local archive.

Figure 9:
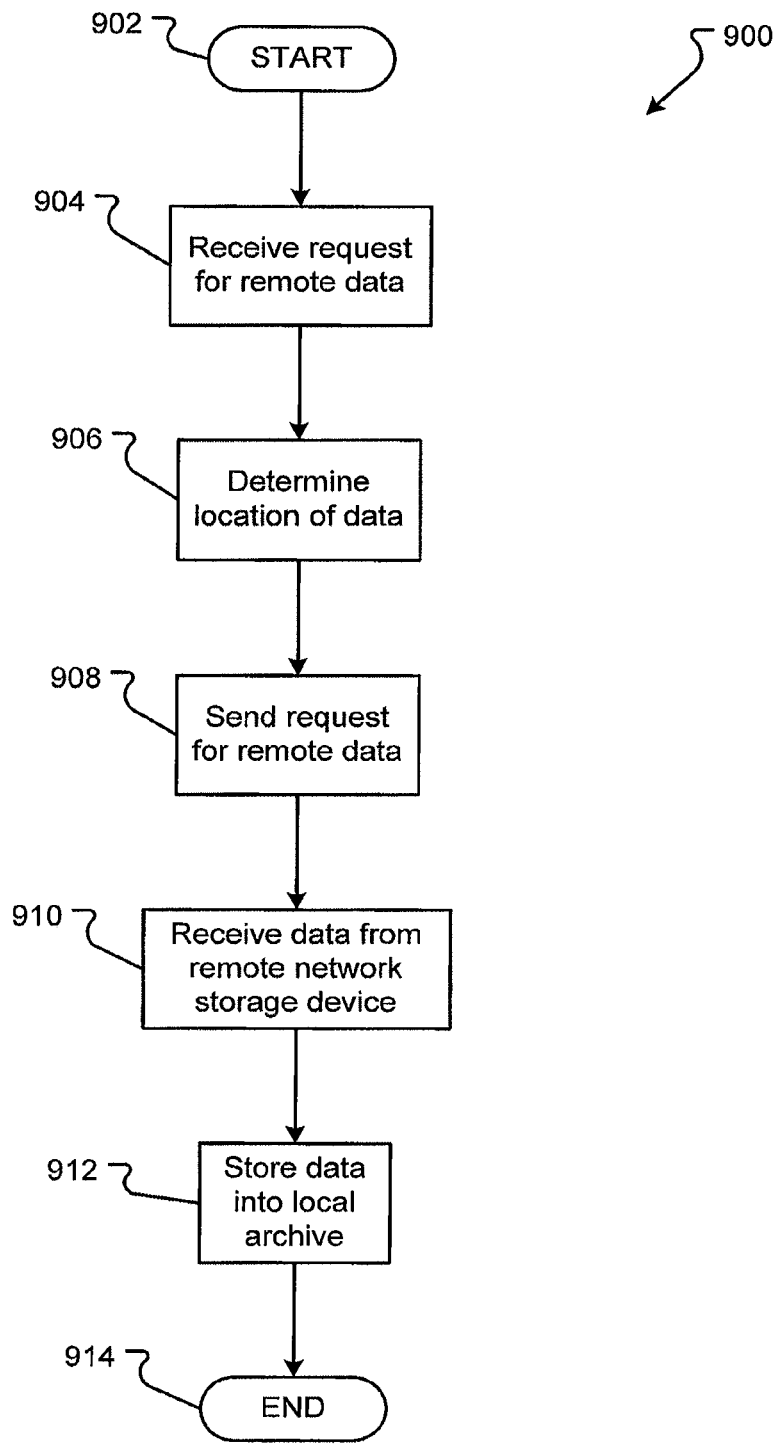
FIG. 9 is a flow diagram of an embodiment of a method for retrieving data from a remote archiving system.

An embodiment of a method 900 for receiving archived data from a remote network storage system in an archiving system is shown in FIG. 9. In embodiments, the method 900 generally begins with a START operation 902 and terminates with an END operation 914. The steps shown in the method 900 may be executed in a computer system as a set of computer executable instructions. While a logical order is shown in FIG. 9, the steps shown or described can, in some circumstances, be executed in a different order than presented herein.

Receive operation 904 receives a request for remote data. In embodiments, the primary network storage system 402 (FIG. 4) or one of the other network storage systems 404, 406, and 408 (FIG. 4) receives a request for archived data. In embodiments, the archival management 310-2 (FIG. 5) receives the request for the archived data. The request may include a file identifier 706 (FIG. 7A) and, in some embodiments, an archive file system identifier 714 (FIG. 7A). The network storage system receiving the request may not have the data locally stored.

Determine operation 906 determines the location of the archived data. The network storage system receiving the request may not have the data locally stored. As such, the network storage system may search for the file identifier 706 (FIG. 7A) in the archive database 318 (FIG. 3). If the file identifier 706 (FIG. 7A) is not in the local database, the network storage system can search the aggregated archive information database 416 (FIG. 4) for the location of the requested data. In embodiments, the network storage system sends a request for the location of the data or request the data from the primary network storage system 402 (FIG. 4). In alternative embodiments, the request for data is received by the primary network storage system 402 (FIG. 4) and the primary network storage system 402 (FIG. 4) searches the aggregated archive information database 416 (FIG. 4). In a further embodiment, the request includes the archive file system identifier 714 (FIG. 7A) and a request for the data is sent automatically to the network storage system 402, 404, 406, and 408 (FIG. 4) associated with the archive file system identifier 714 (FIG. 7A).

Send operation 908 sends a request for the remote data. In embodiments, the primary network storage system 402 (FIG. 4) forwards requests for archived data to the network storage system 404, 406, and 408 (FIG. 4) that stores the data requested. In other embodiments, after locating the requested data, the network storage system 402, 404, 406, and 408 (FIG. 4) makes the request for data to the network storage system 402, 404, 406, and 408 (FIG. 4) having the stored data.

Receive operation 910 receives the response to the request for archive data. In embodiments, the other network storage system 404, 406, and 408 (FIG. 4) sends a packet 414 (FIG. 4) of data to the primary network storage system 402 (FIG. 4) or the other requesting network storage system 402, 404, 406, and 408 (FIG. 4). The network storage system 402 (FIG. 4) can receive the packet 414 (FIG. 4) for further processing.

Store operation 912 stores the archive data in the local storage. In embodiments, the network storage device that receives the data stores the data locally for further use. As such, the received data becomes part of the local archive 414 (FIG. 4).

Figure 10:
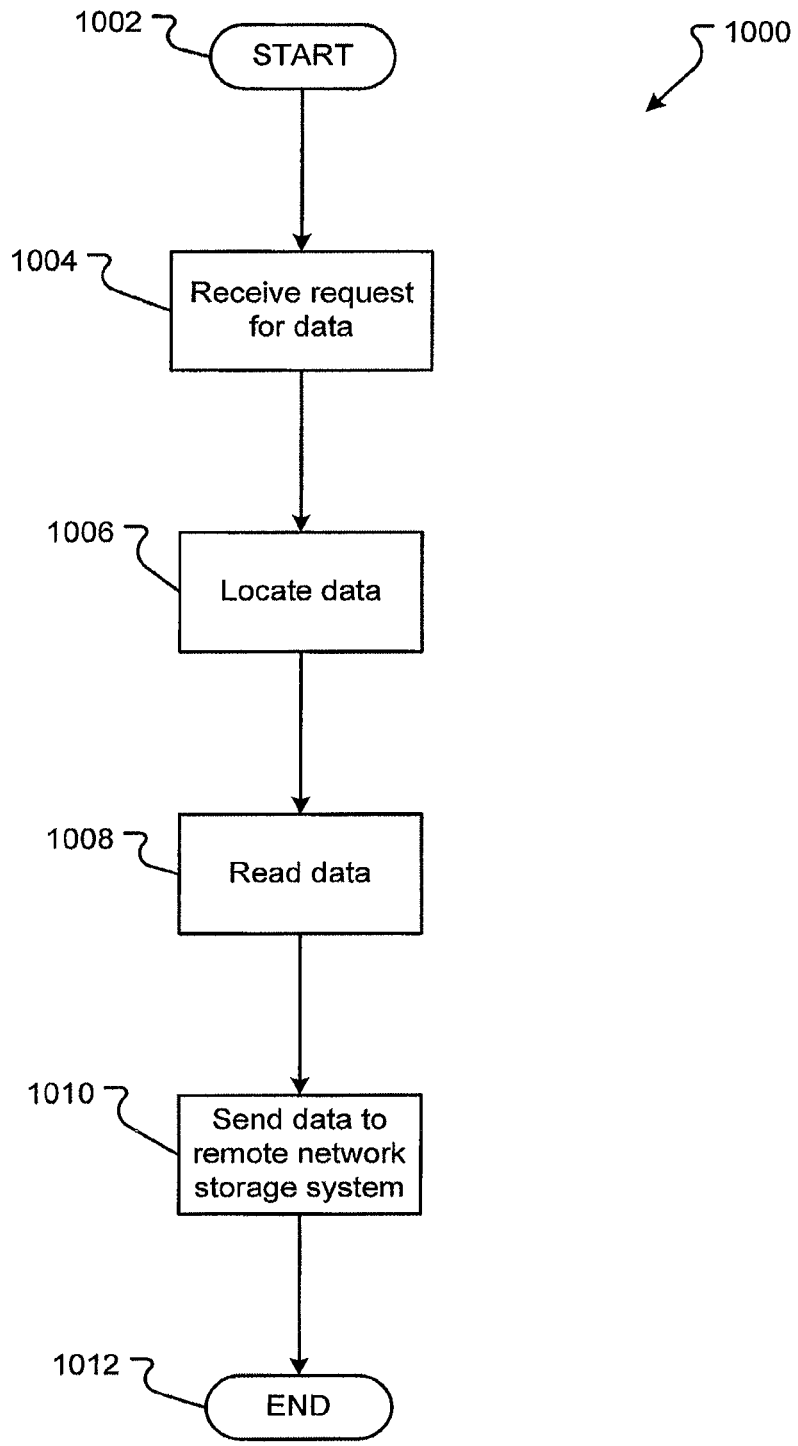
FIG. 10 is a flow diagram of an embodiment of a method for sending data to a remote archiving system that requested data.

An embodiment of a method 1000 for sending archived data to a remote network storage system in an archiving system is shown in FIG. 10. In embodiments, the method 1000 generally begins with a START operation 1002 and terminates with an END operation 1012. The steps shown in the method 1000 may be executed in a computer system as a set of computer executable instructions. While a logical order is shown in FIG. 10, the steps shown or described can, in some circumstances, be executed in a different order than presented herein.

Receive operation 1004 receives a request for data. In embodiments, the primary network storage system 402 (FIG. 4) or one of the other network storage systems 404, 406, and 408 (FIG. 4) receives a request for archived data. In embodiments, the archival management system 310-2 (FIG. 5), through the remote archive interface 515 (FIG. 5), receives the request for the archived data. The request may include a file identifier 706 (FIG. 7A) and, in some embodiments, an archive file system identifier 714 (FIG. 7A). The network storage system receiving the request has the data locally stored.

Locate operation 1006 determines the location of the archived data. The network storage system receiving the request searches the database 318 (FIG. 3) or the local archive 412 (FIG. 4). As such, the network storage system may search for the file identifier 706 (FIG. 7A) in the archive database 318 (FIG. 3). Upon finding the file identifier 706 (FIG. 7A), the network storage system determines the media location 710 (FIG. 7A) or storage location 712 (FIG. 7A) for the requested data.

Read operation 1008 reads the data stored in the determined location. In embodiments, the network storage system having the locally stored archived data reads the data from the storage location in the local archive 412 (FIG. 4). The data may then be placed in a packet 414 (FIG. 4) for transport to the requesting network storage system.

Send operation 1010 sends the data. In embodiments, the primary network storage system 402 (FIG. 4) forwards the archived data to the remote network storage system 402, 404, 406, and 408 (FIG. 4) that requested data. In other embodiments, after locating the requested data, the network storage system 402, 404, 406, and 408 (FIG. 4) sends data to the network storage system 402, 404, 406, and 408 (FIG. 4) making the request.

Figure 11:
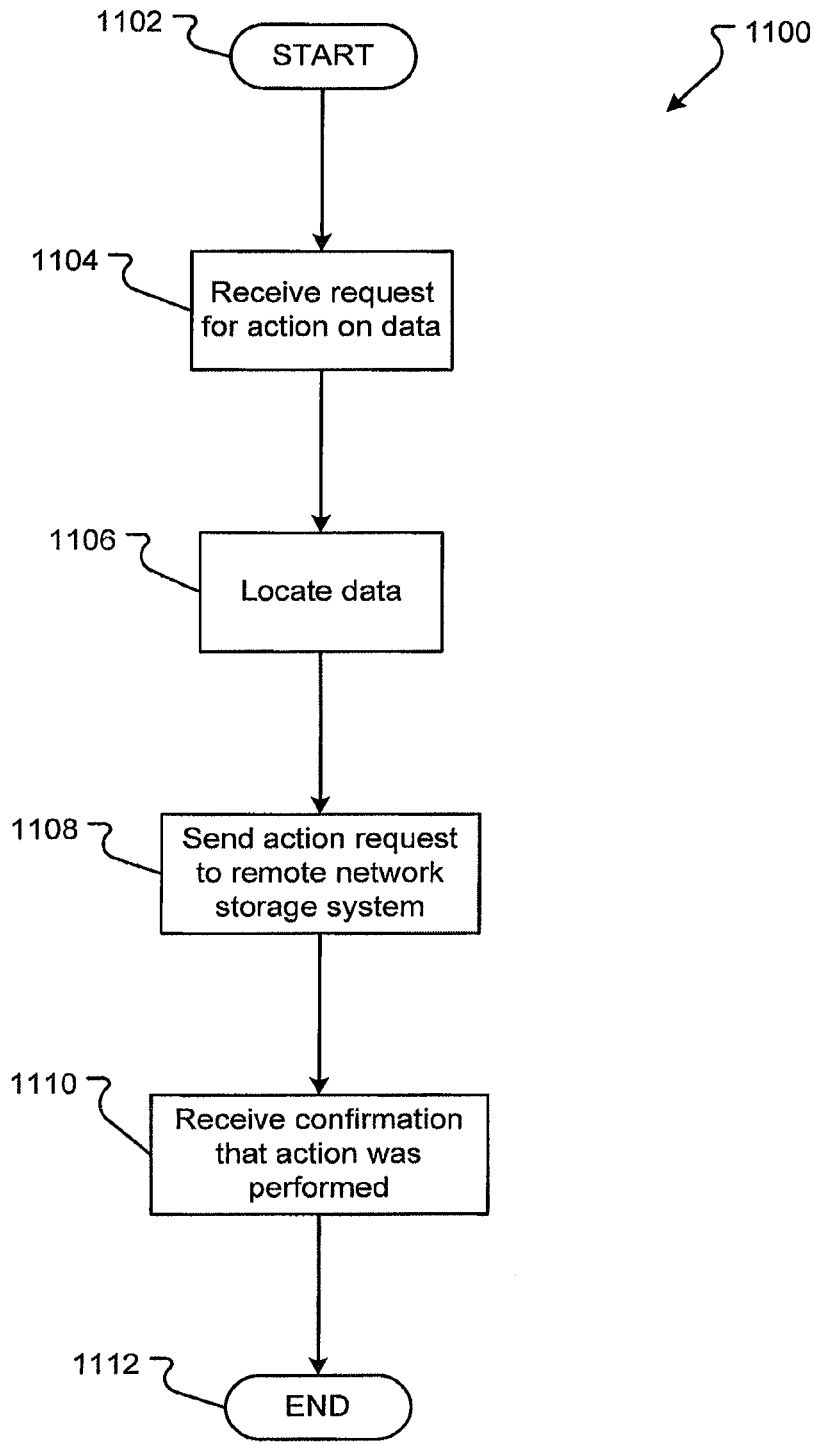
FIG. 11 is a flow diagram of an embodiment of a method for forwarding an action to a remote archiving system.

An embodiment of a method 1100 for receiving archived data from a remote network storage system in an archiving system is shown in FIG. 11. In embodiments, the method 1100 generally begins with a START operation 1102 and terminates with an END operation 1112. The steps shown in the method 1100 may be executed in a computer system as a set of computer executable instructions. While a logical order is shown in FIG. 11, the steps shown or described can, in some circumstances, be executed in a different order than presented herein.

Receive operation 1104 receives a request for an action to be performed on remotely archived data. An action may be a modification of the archived data, a deletion of archived data, an appending of new data onto the archived data, or other action on the archived data, metadata, etc. Remotely archived data is data stored in another network storage system, which may be physically located in another location that is some distance away. In embodiments, the primary network storage system 402 (FIG. 4) or one of the other network storage systems 404, 406, and 408 (FIG. 4) receives a request to perform an action on archived data. An action may be any input or event that may affect or change the archived data. In embodiments, the archival management 310-2 (FIG. 5)

receives the request for the archived data. The request may include a file identifier 706 (FIG. 7A) and, in some embodiments, an archive file system identifier 714 (FIG. 7A). The network storage system receiving the request may not have the data locally stored.

Locate operation 1106 determines the location of the archived data. The network storage system receiving the request may not have the data locally stored. As such, the network storage system may search for the file identifier 706 (FIG. 7A) in the archive database 318 (FIG. 3). If the file identifier 706 (FIG. 7A) is not in the local database 412 (FIG. 4), the network storage system can search the aggregated archive information database 416 (FIG. 4) for the location of the requested data. In embodiments, the network storage system sends a request for the location of the data or requests the data from the primary network storage system 402 (FIG. 4). In alternative embodiments, the request for data was received by the primary network storage system 402 (FIG. 4), and the primary network storage system 402 (FIG. 4) searches the aggregated archive information database 416 (FIG. 4) for the archive file system identifier 714 (FIG. 7A) associated with the file identifier 706 (FIG. 7A). In a further embodiment, the request includes the archive file system identifier 714 (FIG. 7A) and a request for the action is sent automatically to the network storage system 402, 404, 406, and 408 (FIG. 4) associated with the archive file system identifier 714 (FIG. 7A).

Send operation 1108 sends a request for the action to the remote network storage system. In embodiments, the primary network storage system 402 (FIG. 4) forwards requests for actions to the remote network storage system 402, 404, 406, and 408 (FIG. 4) that stores the data requested. In other embodiments, after locating the requested data, the network storage system 402, 404, 406, and 408 (FIG. 4) makes the request for an action to the network storage system 402, 404, 406, and 408 (FIG. 4) having the stored data.

Receive operation 1110 receives the confirmation that the action was performed by the remote network storage system. In embodiments, the other network storage systems 404, 406, and 408 (FIG. 4) send a confirmation that the action was performed to the primary network storage system 402 (FIG. 4) or the other requesting network storage system 402, 404, 406, and 408 (FIG. 4). In other embodiments, the other network storage systems 404, 406, and 408 (FIG. 4) send a signal that the action was not performed to the primary network storage system 402 (FIG. 4) or the other requesting network storage system 402, 404, 406, and 408 (FIG. 4)

Figure 12:
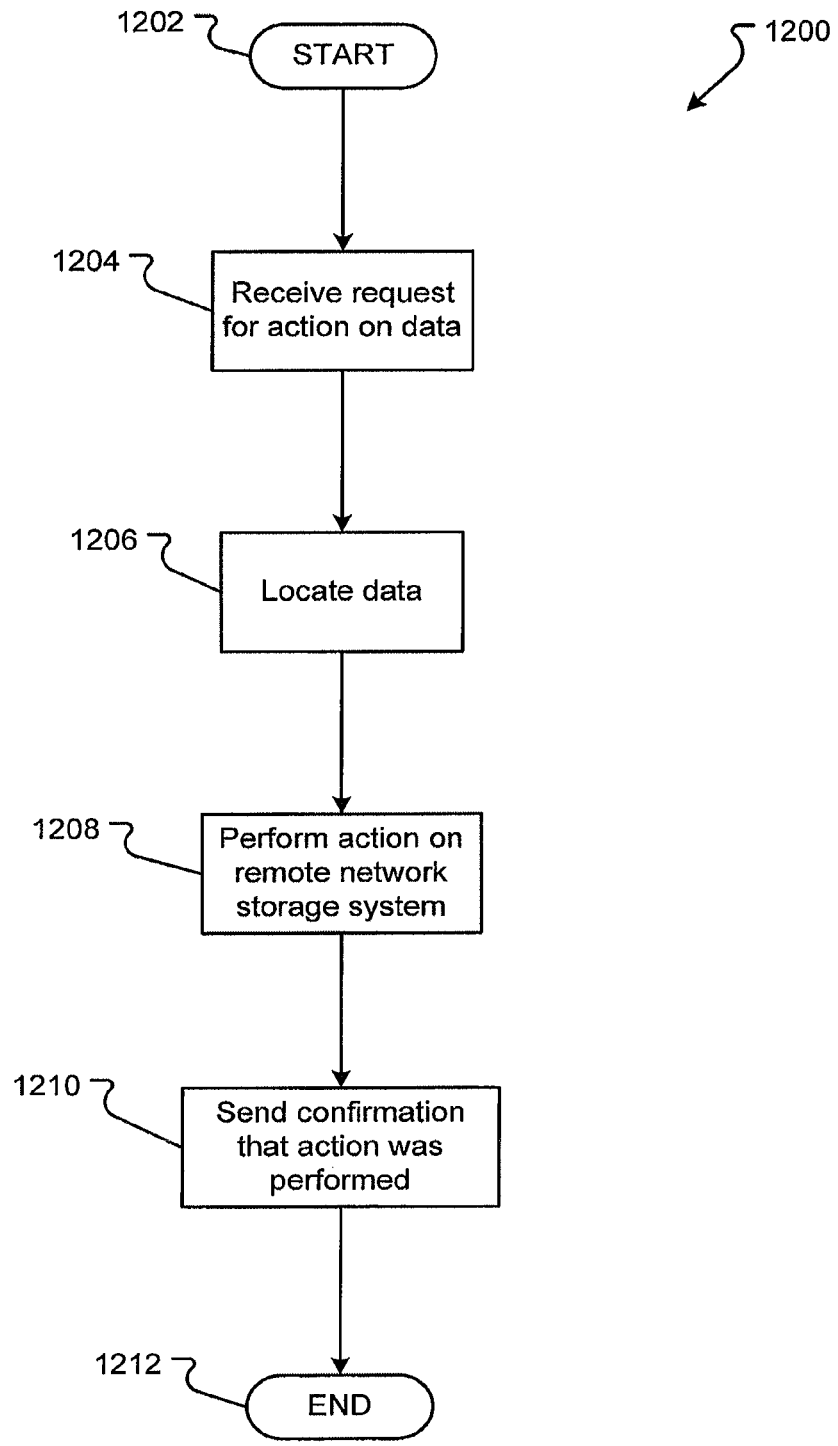
FIG. 12 is a flow diagram of an embodiment of a method for executing an action sent by a remote archiving system.

An embodiment of a method 1200 for having an action performed at a remote network storage system in an archiving system is shown in FIG. 12. In embodiments, the method 1200 generally begins with a START operation 1202 and terminates with an END operation 1212. The steps shown in the method 1200 may be executed in a computer system as a set of computer executable instructions. While a logical order is shown in FIG. 12, the steps shown or described can, in some circumstances, be executed in a different order than presented herein.

Receive operation 1204 receives a request to perform an action on archived data. In embodiments, the primary network storage system 402 (FIG. 4) or one of the other network storage systems 404, 406, and 408 (FIG. 4) receives a request to perform an action on archived data. An action may be any input or event that may affect or change the archived data. In embodiments, the archival management 310-2 (FIG. 5), through the remote archive interface 515 (FIG. 5), receives the request for the action. The request may include a file identifier 706 (FIG. 7A) and, in some embodiments, an archive file system identifier 714 (FIG. 7A). The network storage system receiving the request has the data locally stored.

Locate operation 1206 determines the location of the archived data. The network storage system receiving the request searches the database 318 (FIG. 3) or the local archive 412 (FIG. 4). As such, the network storage system may search for the file identifier 706 (FIG. 7A) in the archive database 318 (FIG. 3). Upon finding the file identifier 706 (FIG. 7A), the network storage system determines the media location 710 (FIG. 7A) or storage location 712 (FIG. 7A) for the requested data as the location.

Perform operation 1208 performs the action on the data stored in the determined location. In embodiments, the network storage system having the locally stored archived data completes the action on the data in the storage location in the local archive 412 (FIG. 4). The action may also not be performed on the data depending on controls associated with the data. The network storage system may then place a confirmation that the action was performed or a signal that the action was not performed in a packet for transport to the requesting network storage system.

Send operation 1210 sends the confirmation. In embodiments, the primary network storage system 402 (FIG. 4) forwards the confirmation to the remote network storage system 402, 404, 406, and 408 (FIG. 4) that requested the action. In other embodiments, after locating the requested data, the network storage system 402, 404, 406, and 408 (FIG. 4) sends the confirmation to the network storage system 402, 404, 406, and 408 (FIG. 4) making the request. The network storage system may also send the signal that the action was not performed.

Figure 13:
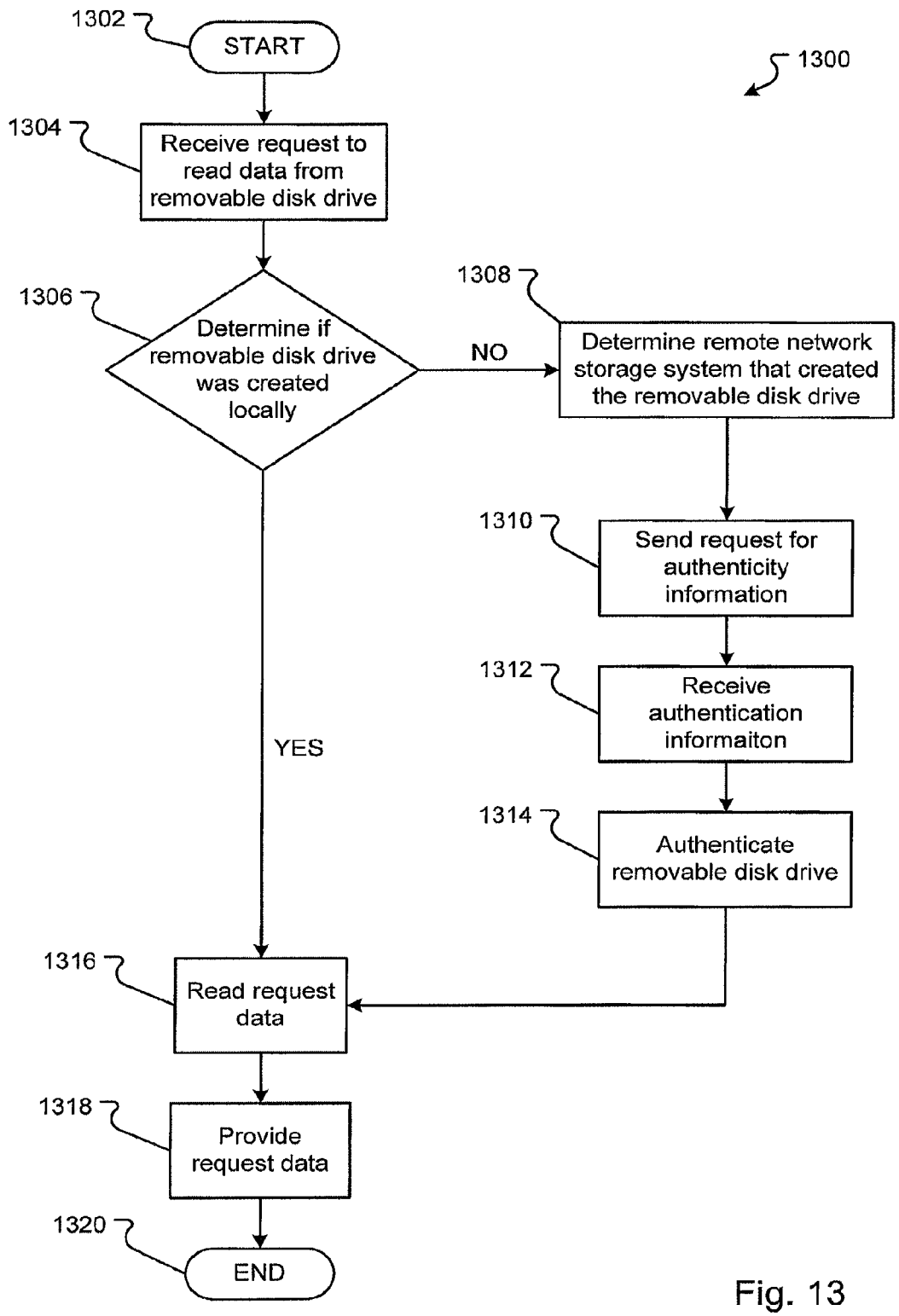
FIG. 13 is a flow diagram of an embodiment of a method for authenticating a removable disk drive with information received from a remote archiving system.

An embodiment of a method 1300 for providing remotely-stored but locally-read data is shown in FIG. 13. In embodiments, the method 1300 generally begins with a START operation 1302 and terminates with an END operation 1320. The steps shown in the method 1300 may be executed in a computer system as a set of computer executable instructions. While a logical order is shown in FIG. 13, the steps shown or described can, in some circumstances, be executed in a different order than presented herein.

In embodiments, data may be stored on a removable disk drive. At some point, the removable disk drive may be removed and placed in storage in a separate physical location. The removable disk drive may then be retrieved from the storage location and reinserted into a drive port of a network storage system. However, the network storage system having the reinserted removable disk drive may not be the same network storage system that stored the data. As such, the network storage system will not be able to authenticate the removable disk drive because the authentication information may be stored with a remote network storage system.

Receive operation 1304 receives a request to read data from a removable disk drive. In embodiments, a request for data is received at a network storage system, which may be the primary network storage system 402 (FIG. 4) or one of the other network storage systems 404, 406, and 408 (FIG. 4). In embodiments, the request for data may require a removable disk drive in physical storage to be reinserted into the network storage system. For example, the storage location 712 associated with the file identifier 706 shows that the removable disk drive is stored in a separate physical location. A request may be sent to the administrator to retrieve and insert the removable disk drive. The administrator retrieves the removable disk drive and inserts the removable disk drive into the network storage system. However, with an aggregated archive information datastore 416 (FIG. 4), the archiving system can insert a removable disk drive into a network storage system that did not create the removable disk drive because authentication information may be retrieved.

Determine operation 1306 determines if the removable disk drive was created locally. In embodiments, the authenticity module 506 (FIG. 5) attempts to authenticate the removable disk drive. If the removable disk drive is authenticated, the removable disk drive was created locally. In contrast, if the removable disk drive cannot be authenticated, the removable disk drive was not created locally. In other embodiments, the archival management system 310 (FIG. 3) determines if the archive file system identifier 714 (FIG. 7A) is the identifier for the local network storage system. If the identifiers match, the removable disk drive was created locally, and the method 1300 flows YES to read operation 1316. If the identifiers do not match, the removable disk drive was not created locally, and the method 1300 flows NO to determine operation 1308.

Determine operation 1308 determines the remote storage system that created the removable disk drive. In embodiments, the archival management system 310 (FIG. 3) reads the archive file system identifier 714 (FIG. 7A) for the remote network storage system that is stored in the aggregated archive information database 416 (FIG. 4). In embodiments, the network storage system sends a request for the location of the data or requests the authentication information from the primary network storage system 402 (FIG. 4). In alternative embodiments, the request for data was received by the primary network storage system 402 (FIG. 4), and the primary network storage system 402 (FIG. 4) searches the aggregated archive information datastore 416 (FIG. 4).

Send operation 1310 sends a request for the authenticity information to the remote network storage system. Every removable disk drive, in embodiments, has a set of authenticity information, such as public key encryption keys or other information, used to authenticate the disk drive. This authentication information is stored locally at the network storage system. In embodiments, the primary network storage system 402 (FIG. 4) forwards requests for authentication data to the remote network storage system 402, 404, 406, and 408 (FIG. 4) that stores the data requested. In other embodiments, after locating the requested data, the network storage system 402, 404, 406, and 408 (FIG. 4) makes the request for authentication information to the network storage system 402, 404, 406, and 408 (FIG. 4) having the stored data.

Receive operation 1312 receives the authentication information. In embodiments, the other network storage system 404, 406, and 408 (FIG. 4) sends the authentication information to the primary network storage system 402 (FIG. 4) or the other requesting network storage system 402, 404, 406, and 408 (FIG. 4). The network storage system 402 (FIG. 4) can receive the authentication information for further processing.

Authenticate operation 1314 authenticates the removable disk drive. In embodiments, the network storage system authenticates the inserted removable disk drive with the received authentication information. The authentication process may be any authentication method known in the art, such as symmetric or asymmetric encryption methods, public key or private key encryption, or other authentication or encryption method. Likewise, the authentication information is any information used to complete the authentication.

Read operation 1316 reads the requested data. After authenticating the removable disk drive, the network storage system can access the removable disk drive and read the data. Provide operation 1318 provides the read data for the requester.

In light of the above description, a number of advantages of the present disclosure are readily apparent. For example, the archiving system is further expandable by providing two or more network storage systems. However, the archiving system can still communicate data among the network storage systems to fulfill action requests. Further, the archiving system may be controlled centrally by a primary network storage system; thus, the archiving system achieves greater stability over the many network storage systems.

A number of variations and modifications of the disclosure can also be used. For example, a shared control over the archiving system that includes two or more network storage systems may be located instead of a single primary network storage system. Further, the aggregated database may be duplicated to all network storage systems to allow quick fail-over of the primary network storage system if a network storage system malfunctions.

While the principles of the disclosure have been described above in connection with specific apparatuses and methods, it is to be clearly understood that this description is made only by way of example and not as limitation on the scope of the disclosure.

What is claimed is:

1. A data archiving system comprising:
a plurality of network storage systems, each network storage system comprising:
a plurality of removable drives, each removable drive comprising a data cartridge and memory operable to store archival data;
a plurality of drive ports, each drive port including a data cartridge connector configured to mate with one of the removable drives, the drive ports configured to receive the archival data from a plurality of application servers and send the archival data to the memory for storage; and
an archiving system appliance configured to manage storage of the archival data on the removable drives, wherein the archiving system appliance operates the removable drives as multiple independent file systems specific to and concurrently accessible by the application servers;
wherein each network storage system is configured to send requests for actions to one or more others of the network storage systems for processing the archival data stored thereon, and to respond to such requests from the other network storage systems.

2. The system of claim 1, further comprising an aggregated archive datastore configured for storing archive file system identifiers for identifying the archival data stored on the plurality of network storage systems.

3. The system of claim 2, wherein the archiving system appliance is configured to receive requests for the archival data from another of the network storage systems, and to determine a location of such requested archival data on the plurality of removable drives.

4. The system of claim 3, wherein the archiving system appliance is further configured to retrieve the requested archival data from one of the removable drives and to send the requested archival data to the other network storage system.

5. The system of claim 1, wherein one of the network storage systems is a primary storage system configured to create an aggregated archive datastore for locating the archival data in the plurality of network storage systems.

6. The system of claim 5, wherein the plurality of network storage systems are configured to designate the primary storage system by voting.

7. The system of claim 5, wherein the primary storage system is configured to:
- receive requests for the archival data from a first of the plurality of network storage systems;
- locate the requested archival data in a second of the plurality of network storage systems by reading information from the aggregated archive datastore; and
- provide the requested data from the second of the network storage systems to the first of the network storage systems.

8. A method for storing archival data for a plurality of applications servers, the method comprising:
- assigning a primary network storage system from among a plurality of network storage systems, each network storage system comprising a plurality of removable drives and a local archive, wherein the plurality of removable drives are operated as multiple independent file systems specific to and concurrently accessible by the application servers;
- creating an aggregated archive datastore at the primary network storage system;
- receiving a request for local archive data at the primary network storage system;
- receiving the local archive data at the primary network storage system, from another of the network storage systems; and
- storing the local archive data in the aggregated archive datastore.

9. The method of 8, further comprising voting by the plurality of network storage systems to assign the primary network storage system.

10. The method of claim 8, further comprising sending the request for local archive data to the primary network storage system from another of the network storage systems.

11. The method of claim 8, wherein creating the aggregate archive datastore comprises creating data structures in the local archive of the primary network storage system.

12. The method of claim 11, further comprising replicating the aggregated archive datastore to another of the other network storage systems.

13. A non-volatile computer readable data storage medium having program data stored thereon, the program data executable by a processor to perform a method comprising:
- receiving from a plurality of application servers requests for archived data stored on a plurality of remote network storage systems, each remote network storage system comprising a plurality of removable drives for storing the archived data, wherein the plurality of removable drives operate as multiple independent file systems specific to and concurrently accessible by the application servers;
- determining a location of the archived data within the plurality of remote network storage systems;
- sending the request for the archived data to one of the remote network storage systems determined to be the location of the archived data; and
- receiving the archived data from the remote network storage system determined to be the location of the archived data, in response to the request.

14. The storage medium of claim 13, the method further comprising providing the archived data to one of the application servers from which the request was received.

15. The storage medium of claim 13, the method further comprising:
- receiving a request to modify the archived data from one of the application servers; and
- modifying the archived data, in response to the request.

16. The storage medium of claim 13, the method further comprising creating an aggregated archive datastore for locating the archival data in the plurality of remote network storage systems.

17. The storage medium of claim 16, the method further comprising:
- searching the aggregated archive datastore for an archive file system identifier; and
- sending the request to the remote network storage system associated with the archive file system identifier.

18. The storage medium of claim 17, wherein the request comprises the archive file system identifier.

19. The storage medium of claim 13, the method further comprising determining whether the archived data were stored on a removable drive locally by the remote network storage system determined to be the location of the archived data.

20. The storage medium of claim 19, the method further comprising sending a request for authentication to another of the remote network storage systems that stored the data on the removable drive.

\* \* \* \* \*